(12) United States Patent
Ishiko

(10) Patent No.: US 8,428,154 B2
(45) Date of Patent: Apr. 23, 2013

(54) COMMUNICATION APPARATUS, COMMUNICATION SYSTEM, WIRE HARNESS AND COMMUNICATION METHOD

(75) Inventor: Shinichi Ishiko, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 276 days.

(21) Appl. No.: 12/992,726

(22) PCT Filed: May 8, 2009

(86) PCT No.: PCT/JP2009/058709
§ 371 (c)(1),
(2), (4) Date: Nov. 15, 2010

(87) PCT Pub. No.: WO2009/145040
PCT Pub. Date: Dec. 3, 2009

(65) Prior Publication Data
US 2011/0064126 A1 Mar. 17, 2011

(30) Foreign Application Priority Data
May 29, 2008 (JP) .................................. 2008-141545

(51) Int. Cl.
*H04B 7/02* (2006.01)
(52) U.S. Cl.
USPC .......................................................... 375/257
(58) Field of Classification Search .................. 375/257
See application file for complete search history.

(56) References Cited

U.S. PATENT DOCUMENTS

| 6,512,307 | B1 | 1/2003 | Ilg |
| 6,985,714 | B2 * | 1/2006 | Akiyama et al. ............... 455/402 |
| 8,209,677 | B2 * | 6/2012 | Shintani et al. ............... 717/172 |
| 2003/0045970 | A1 | 3/2003 | Maryanka |
| 2003/0076221 | A1 * | 4/2003 | Akiyama et al. ......... 340/310.01 |

(Continued)

FOREIGN PATENT DOCUMENTS

| DE | 199 13 919 C1 | 10/2000 |
| JP | A-2001-36592 | 2/2001 |

(Continued)

OTHER PUBLICATIONS

International Search Report mailed Aug. 11, 2009 issued in International Patent Application No. PCT/JP2009/058709 (with translation).

(Continued)

*Primary Examiner* — Juan A Torres
(74) *Attorney, Agent, or Firm* — Oliff & Berridge, PLC

(57) ABSTRACT

Plural electronic control units (ECUs) are connected to each other by an electric power line that is for supplying electric power. Each ECU sends information with a carrier wave having a first frequency lower than a dip frequency estimated by the physical condition and the circuit structure of electric power line, or having a second frequency lower than the first frequency. Or, the physical condition and the circuit structure of electric power line are determined, on the contrary, to make the dip frequency become higher than the frequency of utilized carrier wave. The frequency utilized for sending information may be selected in accordance with the contents of information.

19 Claims, 16 Drawing Sheets

U.S. PATENT DOCUMENTS

| | | |
|---|---|---|
| 2005/0243776 A1 | 11/2005 | Kawabata et al. |
| 2006/0038445 A1 | 2/2006 | Yanagida et al. |
| 2006/0165117 A1 | 7/2006 | Iwamura |
| 2006/0224278 A1 | 10/2006 | Yanagida et al. |
| 2006/0250223 A1 | 11/2006 | Koga et al. |
| 2008/0090544 A1 | 4/2008 | Hubert et al. |

FOREIGN PATENT DOCUMENTS

| | | |
|---|---|---|
| JP | A-2003-124902 | 4/2003 |
| JP | A-2003-249879 | 9/2003 |
| JP | A-2006-42276 | 2/2006 |
| JP | A-2006-67421 | 3/2006 |
| JP | A-2006-222835 | 8/2006 |
| JP | A-2006-287576 | 10/2006 |
| JP | A-2006-295479 | 10/2006 |
| JP | A-2007-209033 | 8/2007 |
| JP | A-2008-503912 | 2/2008 |
| JP | A-2008-84629 | 4/2008 |

OTHER PUBLICATIONS

German Office Action dated Sep. 22, 2011 issued in German Patent Application No. 11 2009 001 289.2 (with translation).

* cited by examiner

FIG. 3A

| ID | DATA LENGTH | NECESSITY OF RE-SENDING DATA | TYPE OF PARITY | SENDING START TIME |
|----|-------------|------------------------------|----------------|--------------------|

FIG. 3B

| DATA | PARITY |
|------|--------|

F I G. 4

| ATTRIBUTE DATA | IMPORTANCE DEGREE OF DATA | |
| --- | --- | --- |
| | IMPORTANT | NOT-IMPORTANT |
| ID | ◯ | ◯ |
| DATA LENGTH | ◯ | ◯ |
| TYPE OF PARITY | HIGHLY ACCURATE | SIMPLE |
| NECESSITY OF RE-SENDING DATA | NECESSARY | NOT-NECESSARY |

COMMUNICATION APPARATUS, COMMUNICATION SYSTEM, WIRE HARNESS AND COMMUNICATION METHOD

This application is the national phase under 35 U.S.C. §371 of PCT International Application No. PCT/JP2009/058709 which has an International filing date of May 8, 2009 and designated the United States of America.

BACKGROUND OF THE INVENTION

1. Field of the Invention

The present invention relates to a communication system for making a plurality of communication apparatus send and receive information through electric power line. Furthermore, the present invention relates to a communication apparatus, a communication system, a wire harness and a communication method for implementing stable high-speed communication.

2. Description of Related Art

It is recently known in several fields to utilize a system having many communication apparatuses, in which each communication apparatus is provided with a certain function and connected with other communication apparatuses in order to perform many operations through the data exchange between many communication apparatuses. For example, it is known in a field of local area network (LAN) mounted on a motor vehicle to utilize electronic control units (ECUs) as the communication apparatuses, to make each ECU perform a certain operation and to exchange data between the ECUs, in order to provide many functions to be implemented by a system.

A number and a type are increased of the communication apparatuses included in a communication system, proportionally to a specializing degree of the function provided to each communication apparatus, as well as an increasing degree of the functions performed by each communication apparatus. Furthermore, a number is also increased of communication lines for connecting communication apparatuses with each other. Moreover, it is required to send and to receive large amounts of data in high-speed, proportionally to an increasing degree of data amount sent and received in the communication system.

Recently, some attention is drawn to the Power Line Communication method (PLC method) for implementing communications with utilizing communication carrier wave superimposed on the existing electric power line, which is proposed to be applied to an on-vehicle LAN (e.g., Patent Document 1).

Patent Document 2 proposes a signaling method utilizing a new modulating approach for implementing communications among a plurality of apparatuses through DC electric power line and for implementing efficient and high-speed signal transmission over a plurality of frequency channels. This signaling method modulates the carrier wave by an approach of Binary Phase-Shift Keying (BPSK), Quaternary Phase-Shift Keying (QPSK), Amplitude Modulation (AM), Frequency Modulation (FM), Code Division Multiple Access (CDMA) or the like, and modifies the carrier wave by an approach of phase shift, amplitude shift, frequency shift or the like.

In the case that a plurality of communication apparatuses performs data transmission through a connection line (communication line or electric power line), arbitration is required for preventing a data sending operation of communication apparatuse from conflicting with another data sending operation of another communication apparatus. For example, in the control area network (CAN), only one communication apparatus can send data among a plurality of communication apparatuses connected with each other through a communication line, and the other communication apparatuses are controlled to wait until said one communication apparatus has completed the data sending operation. When plural communication apparatuses try to send data concurrently, it causes conflicts of sending data. Thus, each communication apparatus performs the arbitration with the other communication apparatuses and then sends the data.

The data sent in the CAN protocol includes an identifier (ID) that is assigned to each king of information included in the sent data for identifying said each kind of information. The arbitration of sending data is performed with utilizing the ID as the information representing priority, and the data field including the ID of the sent data is called the arbitration field. For example, a smaller number is assigned as the ID to higher importance information, such as status information about engine of a vehicle, and a larger number is assigned as the ID to lower importance information.

The CAN utilizes two-wire bus for sending and receiving the operation signals, and utilizes two types of bus values: a dominant value corresponding to data "0" and a recessive value corresponding to data "1". When one communication apparatus sends a dominant value in the case that plural communication apparatuses are sending data through the bus standardized by the CAN, the bus value becomes to be the dominant value. During the data sending operation, each communication apparatus performs bitwise comparison between a value in the arbitration field of the sent data and the bus value. In the case that the bus value of the communication line is the dominant value corresponding to data "0" at the time when the communication apparatus sends the recessive value corresponding to data "1", the communication apparatus stops sending the data and then performs the receiving operation. Thus, it is possible to preferably send data whose ID is smaller number, and to perform the arbitration of data sending operation among the plurality of communication apparatuses.

[Patent Document 1] Japanese Patent Application Laid-Open No. 2006-67421
[Patent Document 2] Japanese Patent Application Laid-Open No. 2003-124902

SUMMARY OF THE INVENTION

In the case that a communication carrier wave is superimposed on an electric power line, it is known to cause the dip phenomenon in a transmission frequency characteristic of the electric power line, i.e., the transmission quantity happens to falls down at a specific frequency and the fall is called the dip. When the communication utilizes the frequency band within which the dip is generated, it may cause problems such as digital error.

Such the generation of dip is due to the physical condition and the circuit structure of electric power line that connects a plurality of communication apparatuses and several loads receiving information from these communication apparatuses. As described below, it is thought that the generation of dip, especially in the communication through the electric power line, is due to the existence of branch connection and switch on the electric power line. Assume the structure that the electric power line branches, connects each communication apparatus and load, and includes switches at several positions which switch on-off of supplying electric power for each communication apparatus and load. When the switch is off in the assumed structure, a terminal point becomes an open stub and the communication carrier wave reaches to the open stub. The communication carrier wave is then reflected at the open stub, and thus the transmission wave falls at the specific frequency.

The falling frequency band, especially the frequency band generating the dip (hereinafter, called dip frequency), is determined by each load connected to the electric power line and by the circuit structure of electric power line including resistances, inductances, capacitances and the like. The inventor obtains the knowledge that the dip frequency varies especially according to the branch line length which is from the branch point to the open stub.

It will be explained below about analytical results of the dip frequency variance according to the circuit structure of electric power line, especially according to the branch line length. FIG. 15 is an explanation view showing the circuit structure at the time when the dip frequency is analyzed. FIG. 16A, FIG. 16B and FIG. 16C are graphs showing transmission frequency characteristics under respective conditions. As shown in FIG. 15, a sender is connected to a receiver through the electric power line for implementing the communication utilizing the electric power line, the electric power line has a branch point, and an open stub is formed beyond the branch point. The transmission frequency is analyzed under such the circuit structure.

The sender superimposes the input information signal on the carrier wave and then outputs to the electric power line. The receiver receives the output information through the electric power line and then outputs externally. The electric power line connects the sender with the receiver, and has a branch point between the sender and the receiver. The electric power line has nothing connected beyond the branch point, and thus configures an open stub. The length between the sender and the branch point is configured to be 1 meter, and the length between the branch point and the receiver is configured to be 2 meters. Then, the frequency characteristic is analyzed with changing the branch line length from the branch point to the terminal. The branch line length is changed to be 2, 1.5 and 1 meter.

FIG. 16A shows the transmission frequency characteristic of electric power line under the condition that the transmission line is configured as shown in FIG. 15 and that the branch line length is 2 meters. FIG. 16B shows the transmission frequency characteristic of electric power line under the condition that the transmission line is configured as shown in FIG. 15 and that the branch line length is 1.5 meters. FIG. 16C shows the transmission frequency characteristic of electric power line under the condition that the transmission line is configured as shown in FIG. 15 and that the branch line length is 1 meter. The dip is generated at a specific frequency in any one of graphs showing the transmission frequency characteristic of FIG. 16A, FIG. 16B and FIG. 16C. Furthermore, the dip frequency varies greatly according to the branch line length. Thus, it may be hard for implementing a communication environment being good even with any circuit structure of the electric power line, in the case that the frequency of carrier wave is fixed for the communication through the electric power line.

As described above, the analytical results indicate that the dip frequency greatly varies especially according to the branch line length and, as shown in FIGS. 16A-C, that the dip frequency becomes higher as the branch length becomes shorter. Based on these analytical results, the inventor obtains the knowledge that the dip frequency can be restricted within a frequency band higher than some frequency by setting the physical condition and the circuit structure of electric power line utilized for information transmission, especially by setting the upper limit of branch line length.

In the case that a plurality of communication apparatuses are configured to communicate with the PLC method, one data sending operation may conflict with another data sending operation since the plurality of communication apparatuses are connected to one electric power line. Thus, the arbitration is necessarily even in such the configuration. The CAN communication function is well utilized in the conventional on-vehicle communication apparatus. Thus, in the case that the PLC communication function is applied to such communication apparatus, the communication method implementing PLC is preferred to be similar to the CAN communication method, from the viewpoint of development cost. Furthermore, the arbitration method for PLC is also preferred to be similar to the CAN arbitration method.

As the communication speed of CAN is recently about 500 kbps, the communication speed of PLC is also required to be similar. The frequency should be close to the signal frequency of AM radio broadcast (600 kHz-2 MHz), for implementing the communication speed 500 kbps, which may cause the noise of radio broadcast. Thus, such the frequency should not be directly superimposed on the electric power line. For being superimposed on the electric power line, such the frequency of signal should be changed by the modulation operation. However, in the case that each electronic apparatus performs the modulation/demodulation operation on the signal, the performed operations may cause the delay. Therefore, it is hard for implementing high-speed communication.

The present invention is made in view of such circumstances, and has an object to provide a communication apparatus, a communication system, a wire harness and a communication method that can avoid the frequency at which the dip is generated due to the transmission characteristic based on the communication through the electric power line and can implement the stable high-speed communication through the electric power line.

The present invention has another object to provide a communication apparatus that can utilize the arbitration similar to the CAN method for the data transmission through electric power line between plural apparatuses.

The present invention has another object to provide a communication apparatus that can implement the high-speed communication through electric power line.

The present invention has another object to provide a communication apparatus that can be compact and save costs with utilizing a digital circuit in order to perform data transmission through electric power line.

A communication apparatus of a first aspect according to the present invention sends and receives information through an electric power line, and comprises a sending unit that sends a carrier wave having a frequency lower than a dip frequency which is determined in accordance with a circuit structure of the electric power line.

A communication apparatus of a second aspect according to the present invention comprises the sending unit that is configured to send a carrier wave having a first frequency lower than the dip frequency or having a second frequency lower than the first frequency, and further comprises a sending control means for controlling the sending unit to send information with the carrier wave having the first frequency or the second frequency.

A communication apparatus of a third aspect according to the present invention comprises the sending control means that is configured to set the first frequency being an integer multiple of the second frequency.

A communication apparatus of a fourth aspect according to the present invention comprises the sending control means that controls to send, with the second frequency, attribute information of information to be sent with the first frequency, and that controls to send the information with the first frequency after the attribute information is sent.

A communication apparatus of a fifth aspect according to the present invention comprises the attribute information that includes any one or some among identification information for identifying contents of the information, importance, degree of importance, information length and predetermined sending start time.

A communication apparatus of a sixth aspect according to the present invention comprises the sending control means that controls the information to be sent continuous multiple times.

A communication apparatus of a seventh aspect according to the present invention comprises the sending control means that further comprises a means for adding error detection information to the information and then sending the information to which the error detection information is added.

A communication apparatus of an eighth aspect according to the present invention comprises: the sending unit that is configured to send information for input digital data; and the sending unit that is configured to modulate the carrier wave with ASK standard based on a bit string of the input digital data, and then to send the modulated carrier wave.

A communication apparatus of a ninth aspect according to the present invention comprises: the sending unit that is configured to send information for input digital data; the sending unit that comprises a modulating means for generating a sending signal obtained from the sending data on which modulation is performed by changing output/non-output of the carrier wave based on a bit string of the digital data; the sending unit that is configured to send the sending signal generated by the modulating means to the electric power line; a receiving unit that receives signal sent to the electric power line; an arbitrating means for arbitrating about sending right with another apparatus, through determining whether or not the signal received by the receiving unit matches with the sending signal, and then suspending a sending operation of sending signal performed by the sending unit in the case that the signal received by the receiving unit is determined not to match with the sending signal; and a demodulating means for changing into received data corresponding to existence of the carrier wave.

A communication apparatus of a tenth aspect according to the present invention comprises the sending unit that further comprises an amplitude emphasizing means for emphasizing an amplitude of carrier wave corresponding to a predetermined period from a beginning of sending signal.

A communication apparatus of an eleventh aspect according to the present invention comprises: a sending signal corresponding to each bit of sending data that is configured with signals of the carrier wave for plural cycles; and the amplitude emphasizing means that is configured to emphasize an amplitude of carrier wave for a predetermined cycle generated by the carrier wave generating means.

A communication apparatus of a twelfth aspect according to the present invention comprises the amplitude emphasizing means that is configured to superimpose signal on carrier wave generated by the carrier wave generating means, the signal having a cycle and a phase similar to the carrier wave, and then to emphasize amplitude of the carrier wave.

A communication system of a thirteenth aspect according to the present invention includes a plurality of communication apparatuses connected each other with an electric power line each of which sends and receives information through the electric power line, wherein each communication apparatus comprises a sending unit that sends a frequency, as a carrier wave, lower than a dip frequency determined by a circuit structure of the electric power line.

A communication system of a fourteenth aspect according to the present invention comprises the circuit structure of the electric power line that is configured to make the dip frequency be not less than 20 MHz.

A communication system of a fifteenth aspect according to the present invention comprises a length from a branch point to a terminal that is not more than 4 meters in the circuit structure of the electric power line.

A communication system of a sixteenth aspect according to the present invention comprises the sending unit of the communication apparatus that is configured to send a first frequency lower than the dip frequency or a second frequency lower than the first frequency, as a carrier wave, wherein each communication apparatus further comprises a sending control means for controlling the sending unit to send information with the first frequency or the second frequency as the carrier wave.

A communication system of a seventeenth aspect according to the present invention comprises: the sending control means that is configured to make the sending unit send attribute information, with the second frequency, of the information to be sent with the first frequency; and the seconding control means is configured to make the sending unit send the attribute information and then send the information with the first frequency, wherein each communication apparatus further comprises: a means for distinguishing and receiving information sent with the first frequency or the second frequency; and a means for sending a re-sending request to another communication apparatus when it is failed to receive the information.

A communication system of an eighteenth aspect according to the present invention comprises the sending unit of the communication apparatus that is configured to send information of input digital data, and that comprises a means for modulating the carrier wave with ASK standard based on a bit string of the digital data, and then sending the modulated carrier wave.

A communication system of a nineteenth aspect according to the present invention comprises: the sending unit of each communication apparatus that is configured to send information of input digital data; the sending unit that comprises a modulating means for generating a sending signal obtained from the sending data on which modulation is performed by changing output/non-output of the carrier wave based on a bit string of the digital data; and the sending unit of the communication apparatus that is configured to send the sending signal generated by the modulating means to the electric power line, wherein each communication apparatus comprises: a receiving unit that receives signal sent to the electric power line; an arbitraging means for determining whether or not a signal received by the receiving unit during the sending unit is sending a sending signal matches with the sending signal and then suspending the sending operation performed by the sending unit in the case that the signal is determined not to match with the sending signal, in order to arbitrate about sending right with another apparatus; and a demodulating means for changing into received data corresponding to existence of the carrier wave, in accordance with a signal received by the receiving unit.

A communication system of a twentieth aspect according to the present invention comprises each communication apparatus that is mounted on a vehicle.

A communication system of to a twenty first aspect according to the present invention comprises an electric power line utilized by a communication system according to any one of thirteenth to nineteenth aspects, wherein in the electric power line, a length from a branch point to a terminal is not more than 4 meters.

A communication system of a twenty second aspect according to the present invention is for sending and receiving information through an electric power line, and comprises steps of: sending information through the electric power line with a carrier wave which is a first frequency lower than a dip frequency determined by a physical condition and a circuit constant of the electric power line; and sending attribute information of the information through the electric power line with a carrier wave which is a second frequency lower than the first frequency.

In an aspect according to the present invention, information is sent with utilizing a carrier wave having a frequency lower than a dip frequency. The dip frequency on transmission line is basically estimated from the physical conditions of electric power line and the circuit constant, such as a load, a resistance, an inductance, and a capacitance connected to the electric power line. Especially, the dip frequency generated by the transmission through the electric power line varies in accordance with the branch line length of electric power line. In the case that an upper limit is set for the branch line length, the dip frequency varies within a frequency band not less than a frequency corresponding to the set upper limit, in accordance with the branch line length. Therefore, it is possible to avoid the dip and to implement relatively stable transmission of information, by making the frequency utilized for the communication carrier wave become lower than such the frequency.

Alternatively, the frequency for the carrier wave may be determined in consideration of the effect caused by the radio frequency, and the like. In this alternative case, the physical condition and the circuit constant of the electric power line (i.e., transmission line) is determined to make the dip frequency become higher than the frequency of carrier wave.

In an aspect according to the present invention, the physical condition of electric power line is determined to make the dip frequency become higher than the frequency of carrier wave when the frequency of carrier wave is determined. Especially, the branch line length is determined to be not longer than a predetermined length. For example, the upper limit is determined to be not longer than 4 meters for the branch line length from the branch point to the terminal of electric power line (i.e., transmission line), in order to make the dip frequency become higher than about 19 MHz in the case that the upper limit frequency of carrier wave is determined to be 20 MHz.

In an aspect according to the present invention, information is sent with utilizing the carrier wave having a first frequency lower than the dip frequency, and information is sent with utilizing the carrier wave having a second frequency lower than the first frequency. Although a higher frequency should be utilized for sending information having larger communication traffic volumes, such the higher frequency carrier wave is susceptible to the dip. In the case that information is sent with utilizing the second frequency which is lower than the first frequency, it is possible to protect the information sent with the second frequency from the dip effects, better than the information sent with the first frequency. It is configured to select the carrier wave having the first frequency or the carrier wave having the second frequency for sending information, in accordance with contents or importance degree of sent information. For example, the first frequency is selected for sending information having larger amount of data to be sent with high-speed, and the second frequency is selected for sending information having lower amount of data with low-speed or for sending information to be sent more stably. Therefore, it is possible to implement the efficient and stable transmission through the electric power line.

In an aspect according to the present invention, the first frequency is the integral multiple of second frequency and thus, it is possible to utilize the same clock signal as the standard. Hence, it is possible to implement the efficient and stable communication with utilizing carrier waves having two different frequencies for transmitting information, and to implement reducing the number of parts required for each communication apparatus and reducing the weight of each communication apparatus, with the configuration that required lines are saved by the communication through the electric power line and the integral multiple frequencies are utilized with the same clocking circuit.

In an aspect according to the present invention, it is configured to send the attribute information with the second frequency, as the attribute information is for the information to be sent with the first frequency, and then send the information with the first frequency. For example, the attribute information is identification information for identifying contents of information to be sent, degree of importance, information length, predetermined sending start time, or some of them. Thus, another communication apparatus can receive the attribute information that is sent at first, and recognize, on the basis of the received attribute information, contents of information that is sent at second. Hence, another communication apparatus can determine whether to receive the information sent at second or not. Therefore, it is possible to implement the stable communication through transmission with the carrier waves having frequencies outside the band range having the dip frequency effects, and implement the efficient information transmission.

In an aspect according to the present invention, it is configured to send the information at continuous multiple times which should be sent with the first frequency. Although being sent with the first frequency, such the information is susceptible to the dip more than the information sent with the second frequency, and thus the communication error may be caused. The continuous multiple sending operations contribute to increase the possibility of successful receiving. Therefore, it is possible to implement more stable communication.

In an aspect according to the present invention, it is configured to add the error detection information to the information to be sent with the first frequency. Although being sent with the first frequency, such the information is susceptible to the dip more than the information sent with the second frequency, and thus the communication error may be caused. The sending operation with the added error detection information contributes to detect the error in the received information. Thus, it is possible to prevent the received information including error from utilizing for processing. Therefore, it is possible to implement more stable communication.

In an aspect according to the present invention, it is configured to send digital data, as the information, with ASK method which changes the amplitude of carrier wave between the case of data bit being "0" and the case of data bit being "1". Since the amplitude is changed between the case of data bit being "0" and the base of data bit being "1", it is possible to output no carrier wave in the case of "0", to output the carrier wave in the case of "1", and thus to distinguish the signal based on the existence of carrier wave. Therefore, the communication apparatus can easily perform the determination about the signal currently being sent through the electric power line.

In an aspect according to the present invention, it is configured to generate the carrier wave lower than the dip frequency, to change the output/non-output of carrier wave based on the digital value (0/1) of sending data, thus to modulate the sending data and to superimpose the modulated signal on the electric power line for the sending operation. This modulation is so-called on-off keying modulation (OOK modulation). For example, it can be configured to output the carrier wave in the case of the sending data being "0" and to not output the carrier wave in the case of the sending data being "1". Thus, when at least one communication apparatus outputs the carrier wave corresponding to data "0" in the case that plural communication apparatuses concurrently send signals, all the other communication apparatuses can detect the output carrier wave. Hence, it is possible to perform the communication having priority for data "0" similar to CAN, and perform the arbitration similar to CAN. The OOK modulation is a type of the amplitude-shift keying modulation (ASK modulation) and utilizes simple steps. Therefore, the OOK modulation has advantages that it can be implemented with a small set of hardware and with low costs.

As described above, the communication apparatus checks the signal on the electric power line after superimposing the modulated sending signal to the electric power line, can recognize that another apparatus is currently sending information which has a priority higher than the priority of own signal, and thus can receive the sending signal from said another apparatus after stopping to send own signal.

After receiving the signal sent from said another apparatus, the communication apparatus can modulate the received signal to be 0/1 digital data based on the existence of carrier wave.

In short, the communication apparatus according to the present invention can perform data transmission through the electric power line with a procedure similar to the procedure for the data transmission performed through the communication line based on the CAN.

In an aspect according to the present invention, it is configured to send each bit of the sending data after emphasizing signal amplitudes in a predetermined period from the beginning of the sending signal modulated by the method described above. Thus, an on-vehicle electric power line communication apparatus, which receives this sending signal, can detect the sending signal before the sending signal actually arrives. Therefore, it is possible to implement the high-speed communication. Additionally, it is configured to emphasize only in the predetermined period from the beginning of the sending signal, but not in all the period from the beginning of the sending signal. Therefore, it is possible to prevent the consumed power, noise and the like, from increasing.

In an aspect according to the present invention, for example, an on-vehicle electric power line communication apparatus may modulate the sending data with the carrier wave about 2-20 MHz when sending the sending data with 500 kbps. In such the case, one bit of the sending data includes the carrier waves for not-less than tens of cycles, and thus the on-vehicle electric power line communication apparatus emphasizes the signal amplitude of the carrier waves for some cycles from the beginning of each bit of the sending data. Therefore, the on-vehicle electric power line communication apparatus can emphasize only for the predetermined period of the sending signal.

In an aspect according to the present invention, an on-vehicle electric power line communication apparatus superimposes signals on the basic carrier wave when emphasizing some cycles of carrier waves, while the superimposed signals have a cycle and a phase same as the cycle and the phase of basic carrier wave. Thus, the amplitude of carrier wave can be emphasized without changing the cycle, the phase and the like, and the starting time of carrier wave can be accelerated. Therefore, it is possible to accelerate the stating time of sending signal modulated by the carrier wave, and make the receiver on-vehicle electric power line communication apparatus early detect the arrival of sending signal.

In an aspect according to the present invention, each communication apparatus sends a re-sending request in the case of failing to receive. Therefore, it is possible to stably receive information, even when the transmission of the information becomes unstable due to the dip effects.

In an aspect according to the present invention, each communication apparatus is mounted on a vehicle. As the communication system mounted on the vehicle is especially required for the weight reduction, the communication through the electric power line can reduce the weight. As the communication system mounted on the vehicle is additionally required for the stable, the efficient and the fast transmission without errors since transmitting information about the cruise control of the vehicle, it is possible to implement the efficient and the stable communication with utilizing two of different frequencies.

In an aspect according to the present invention, each communication apparatus performs transmitting information through the electric power line with any one of two frequencies which have different frequencies from each other lower than the dip frequency estimated in accordance with the physical condition and the circuit structure of electric power line. Therefore, the communication through the electric power line can save the required lines, avoid the dip frequency and implement the efficient and the stable high-speed communication.

In an aspect according to the present invention, it is configured to change the output/non-output of the carrier wave based on the digital value of sent data for modulating the sending data, to superimpose the modulated signal on the electric power line for outputting, and to arbitrate in accordance with the existence of change in the output signal. Therefore, the communication apparatus can perform the high-speed data transmission through the electric power line with utilizing a procedure similar to the procedure of CAN. Since it is possible to easily recognize the signal currently sent through the electric power line in accordance with the existence of the carrier wave, it is possible to reduce the delay time due to the arbitration.

Hence, it is possible to easily develop the communication apparatus according to the present invention, with utilizing a conventional communication apparatus, as a base, that is provided with the communication function standardized by the CAN. Furthermore, it is possible to easily apply the communication function through the electric power line according to the present invention, as an option, to a conventional communication apparatus.

Additionally, since it is configured for each bit of sending data to emphasize the signal amplitudes in a predetermined period from the beginning of the sending signal, the receiver communication apparatus can early detect the arrival of signal, and thus it is possible to implement the high-speed communication.

Because of the reasons described above, it is possible in the present invention to easily develop the communication apparatus performing the high-speed communication through the electric power line with the method similarly to the CAN. Furthermore, it is possible to reduce the number of communication lines and the weight of wire harness required for mounting on the vehicle, and to efficiently reduce the weight of motor vehicle, with utilizing the communication apparatus according to the present invention for the motor vehicle.

The above and further objects and features of the invention will more fully be apparent from the following detailed description with accompanying drawings.

BRIEF DESCRIPTION OF THE DRAWINGS

FIG. 3A is an explanation view showing a format of data transmitted between ECUs according to the embodiment 1.

FIG. 3B is an explanation view showing a format of data transmitted between ECUs according to the embodiment 1.

FIG. 4 is an explanation view showing example contents of attribute data sent with a second transmitting circuit by the controlling unit of the ECU according to the embodiment 1.

DESCRIPTION OF THE PREFERRED EMBODIMENTS

Hereinafter, embodiments of the present invention are described in detail with reference to drawings. In embodiments described below, communication apparatuses according to the present invention are described in the context of plural ECUs included in a communication system that is mounted on a motor vehicle such as a car.

Embodiment 1

Figure 1:
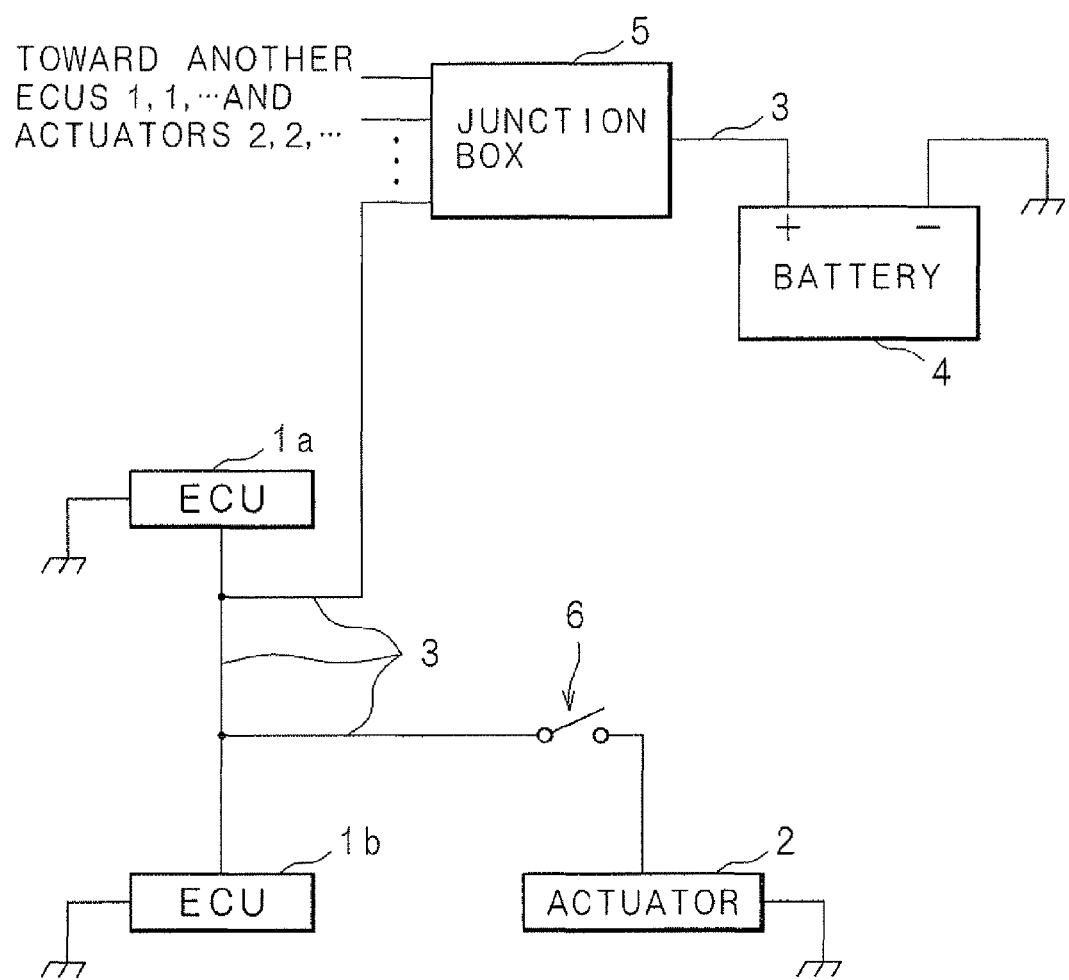
FIG. 1 is a block diagram showing a configuration of a communication system according to an embodiment 1.

FIG. 1 is a block diagram showing a configuration of a communication system according to an embodiment 1. The communication system is configured to include: plural ECUs 1, 1, . . . ; actuators 2, 2, . . . that work on the basis of control data sent from the ECUs 1, 1, . . . ; electric power lines 3, 3, . . . for supplying electric power to respective ECUs 1, 1, . . . and actuators 2, 2, . . . ; a battery 4 that supplies electric power through the electric power lines 3, 3, . . . to respective apparatuses; branch points of the electric power lines 3, 3, . . . and a junction box 4 for relaying.

The electric power is stored in the battery 4 by an alternator (not shown) that generates electric power with utilizing power obtained from an engine. The battery 4 has a terminal (minus terminal) that is grounded and the other terminal (plus terminal) that is connected to the junction box 5 through the electric power line 3. For example, the battery 4 supplies 12V driving voltage to each apparatus.

The junction box 5 includes a branch point of the electric power line 3 and a relaying circuit. The junction box 5 is connected to plural branched electric power lines 3, 3, . . . that are connected to the ECUs 1, 1, . . . and the actuators 2, 2, . . . , respectively. The junction box 5 distributes the electric power supplied by the battery 4 to the ECUs 1, 1, . . . and to the actuators 2, 2, . . . mounted on the motor vehicle.

Among the plural power lines 3, 3, . . . branching from the junction box 5, there is one electric power line 3 connected to an ECU 1a which is one of ECU 1. Thus, the ECU 1a can obtain electric power supplied from the battery 4. The electric power line 3 is further connected to an ECU 1b which is another one of ECU 1, and can supply electric power to the ECU 1b. The electric power line 3 branches and is connected to the actuator 2 through a switch 6, while connecting the ECU 1a to the ECU 1b. It is configured to supply electric power from battery 4 to the actuator 2 and to make the actuator 2 work, when the switch 6 is "on".

Any ECUs 1, 1, . . . , or actuators 2, 2, . . . is configured to have the connected electric power line 3 that is further connected to a body earth (GND) through own components and loads.

In the communication system according to the embodiment 1, respective ECUs 1, 1, . . . not only can obtain electric power from the battery 4 through the electric power lines 3, 3, . . . in order to work, but also can superimpose the communication carrier wave on the electric wave utilized for supplying electric power to the electric power lines 3, 3, . . . that connect respective ECUs 1, 1, . . . in order to implement the power line communication (PLC) performing data transmission. Thus, respective ECUs 1, 1, . . . do not require extra communication signal lines for transmitting the cruise control data, the view data, and the like. Therefore, it is possible to reduce the weight of harness mounted on the motor vehicle.

Figure 2:
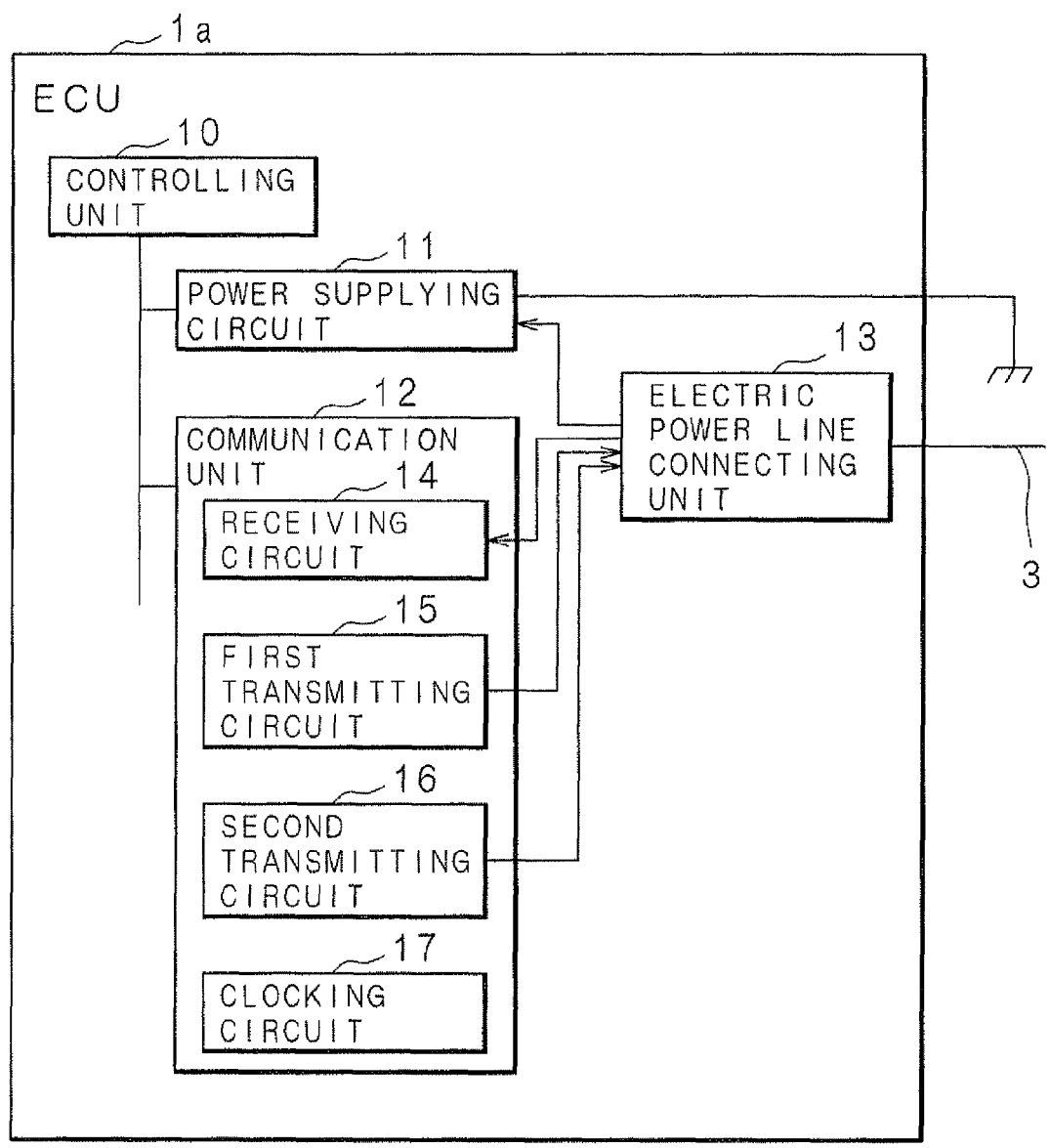
FIG. 2 is a block diagram showing an inner configuration of an ECU included in the communication system.

Next, it will be described about a configuration that respective ECUs 1, 1, . . . implement the PLC through the electric power line 3. FIG. 2 is a block diagram showing an inner configuration of the ECU 1a. The ECU 1b and the other ECUs 1, 1, . . . have inner configurations similar to the inner configuration of the ECU 1a, respectively. Thus, these inner configurations of the ECU 1b and the other ECUs 1, 1, . . . are not described in detail.

The ECU 1a includes a controlling unit 10, a power supplying circuit 11, a communicating unit 12 and an electric power line connecting unit 13.

The controlling unit 10 utilize a microcomputer, receives electric power supplied through the power supplying circuit 11, and controls data transmission performed by the communicating unit 12 or operations of another component (not shown).

The electric power line connecting unit 13 includes: a filtering circuit (not shown) for distributing electric power supplied through the electric power line 3 toward the power supplying circuit 11; and another filtering circuit (not shown) for distributing data to be transmitted through the electric power line 3 toward the communication unit 12.

The power supplying circuit 11 is connected to the controlling unit 10, the communicating unit 12 and another component (not shown), and supplies electric power to each component. For example, the power supplying circuit 11 receives 12V drive voltage from the battery 4 through the electric power line connecting unit 13 and the electric power line 3, properly adjusts the received 12V driving voltage to the voltages required for respective components, and supplies the adjusted voltage.

The communicating unit 12 utilizes a network controller, and thus implements data transmission with another ECUs 1, 1, . . . and actuators 2, 2, . . . . It is configured to basically utilize the carrier sense multiple access (CSMA) method for the data transmission performed by the communicating unit 12 with another apparatus. In other words, the ECU 1a performs the data receiving operation because of failing to perform the data sending operation when the ECU 1b, which is another ECU connected to the same electric power line 3, is currently sending data, but the ECU 1a can perform the data sending operation when the ECU 1b is not sending data. The communicating unit 12 includes a receiving circuit 14, a first transmitting circuit 15, a second transmitting circuit 16, and a clocking circuit 17.

The first transmitting circuit 15 and the second transmitting circuit 16 are respectively performs modulation, such as the amplitude shift keying (ASK) modulation, the frequency shift keying (FSK) modulation, and the phase shift keying (PSK) modulation, on the data signal representing the data input from the controlling unit 10, and then sends data to another ECUs 1, 1, . . . and to actuators 2, 2, . . . through the electric power line 3 and the electric power line connecting unit 13. It should be noted that the modulation method is not limited to those described above. The clocking circuit 17 outputs a clock signal having a predetermined frequency, and the output clock signal is input into the first transmitting circuit 15 and the second transmitting circuit 16. The first transmitting circuit 15 and the second transmitting circuit 16 respectively superimpose data on the carrier waves having different frequencies f1 and f2 based on the clock signal, and then sends the superimposed data.

The frequencies f1 and f2 (f1>f2) of the carrier waves are configured to be about 2-20 MHz, as being utilized by the first transmitting circuit 15 and the second transmitting circuit 16. The reason is described below. Firstly, the frequencies f1 and f2 should be different from the AM radio frequency (0.53-1.6 MHz in Japan), the FM radio frequency (76-80 MHz in Japan) and the ground digital TV signal frequency (470-770 MHz in Japan), in order to avoid effects on the entertainment apparatus mounted on the motor vehicle, such as the audio apparatus including a radio amplifier and the portable TV.

Secondary, the electric power line 3 connecting ECU 1a to the ECU 1b has a branch point connected to the switch 6, and thus the branch line from the branch point to the switch 6 (i.e., terminal point) configures a quarter wave open stub in the case that the switch 6 is "off". There is a problem for implementing the PLC through the electric power line 3 about the dip frequency caused in the transmission frequency characteristic by the configured quarter wave open stub.

Figure 16A:
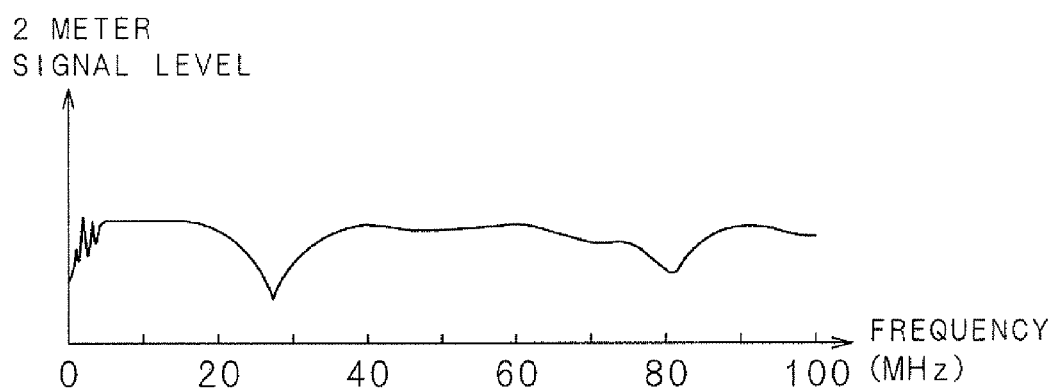
FIG. 16A is a graph showing a transmission frequency characteristic in a condition.
Figure 16B:
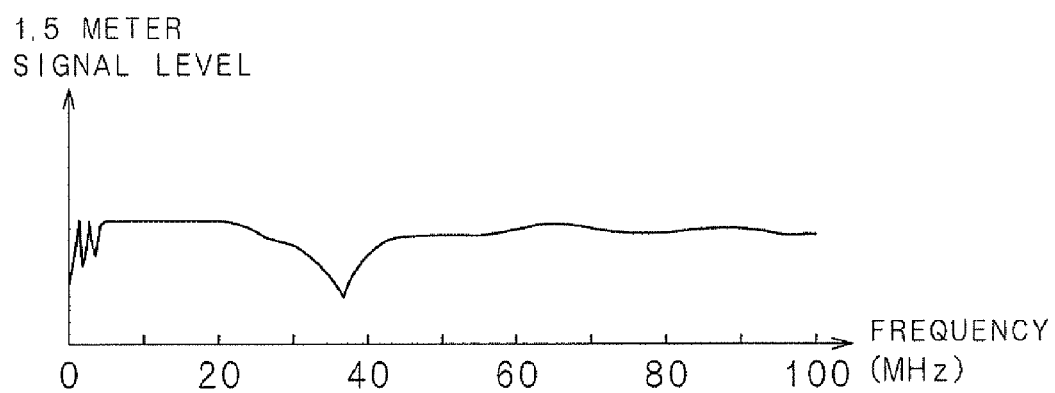
FIG. 16B is a graph showing the transmission frequency characteristic in another condition.
Figure 16C:
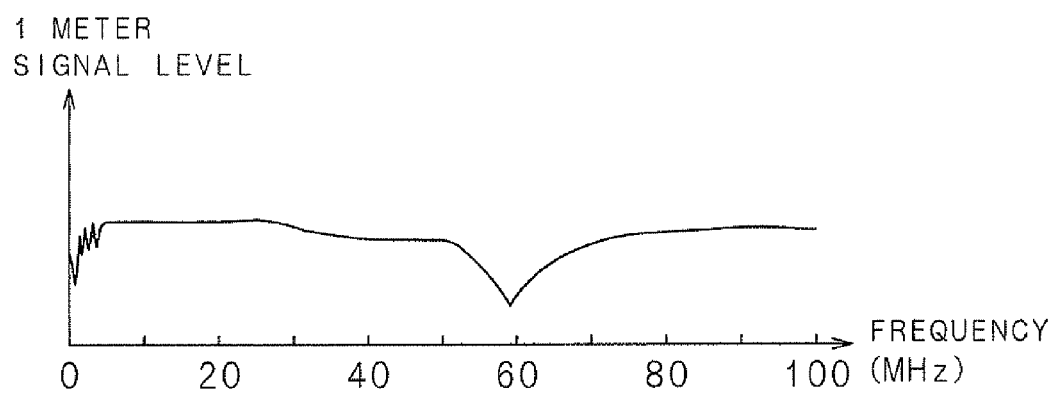
FIG. 16C is a graph showing the transmission frequency characteristic in another condition.

As shown in FIG. 15, FIG. 16A, FIG. 16B and FIG. 16C, the obtained analytical results indicate that the dip frequency varies in accordance with the branch line length of the electric power line 3. As shown in FIG. 16A, FIG. 16B and FIG. 16C, the dip frequency is about 30 MHz in the circuit structure of FIG. 15 having the branch line whose length is 2 meters, the dip frequency is about 40 MHz in the circuit structure of FIG. 15 having the branch line whose length is 1.5 meters, and the dip frequency is about 60 MHz in the circuit structure of FIG. 15 having the branch line whose length is 1 meter. The upper limit of the branch line length is set to be about 4 meters, in consideration of these analytical results, the arrangement of plural ECUs mounted on the motor vehicle and the number of ECUs connected to the same electric power line. The inventor has obtained the knowledge based on analysis that the dip frequency is about 19 MHz in the physical condition where the branch line length is 4 meters. In the physical condition where the branch line length is shorter than 4 meters, the dip frequency becomes high frequency not lower than 19 MHz. The electric power line 3 according to the embodiment 1 is configured to make the branch line length become shorter than 4 meters when the switch 6 is "off". Therefore, the dip frequency is specified within the band range not lower than about 19 MHz.

Therefore, it is configured to set the frequencies f1 and f2 about 2-20 MHz which are utilized for transmitting information between the ECUs 1, 1, . . . , in order avoid the AM radio frequency and the dip frequency described above and to implement the transmission of larger data, such as view data. In addition, the frequency f1 of the carrier wave for the first transmitting circuit 15 is configured to be integral multiple of the frequency f2 of the carrier wave for the second transmitting circuit 16. The first transmitting circuit 15 generates the integrally multiplied frequency based on the clock signal, utilizes the generated frequency as the carrier wave, and thus sends data. For example, the first transmitting circuit 15 sends data with the carrier wave having 18 MHz frequency f1, and the second transmitting circuit 16 sends data with the carrier wave having 9 MHz frequency f2. The first transmitting circuit 15 and the second transmitting circuit 16 can share the same clock signal, generate carrier waves based on the shared clock signal and send data, since the frequency f1 is configured to be the double of the frequency f2.

The receiving circuit 14 corresponds to the data sent with carrier waves having two of different frequencies by the first transmitting circuit 15 and the second transmitting circuit 16, and can distinctively receive respective data sent with carrier waves having two of different frequencies f1 and f2 (18 MHz and 9 MHz). Particularly, the receiving circuit 14 includes respective filtering circuits for extracting carrier waves having frequencies f1 and f2. The receiving circuit 14 outputs received data to the controlling unit 10, when detecting the data received through the electric power line 3.

In the ECU 1a having such the configurations described above, the controlling unit 10 controls to send the data through the first transmitting circuit 15 or the second transmitting circuit 16. The ECUs 1, 1, . . . perform transmission of data through the electric power line 3 based on respective functions, such as the cruise control data and the view data. The controlling unit 10 utilizes the first transmitting circuit 15 for sending such data. Therefore, larger data such as the view data can be sent with the carrier wave having higher frequency f1. Then, the controlling unit 10 utilizes the second transmitting circuit 16 for sending attribute data representing contents of data to be sent, such as the cruise control data or the view data. Therefore, it is possible to reduce the possibility that the dip frequency causes effects on the transmission of attribute data, and to implement more stable transmission of attribute data, even in the case that the data transmission with the carrier wave having 18 MHz frequency f1 is susceptible to the dip frequency under the circuit structure estimated to generate about 20 MHz dip frequency.

FIG. 3A and FIG. 3B are explanation views showing formats of data transmitted between ECUs 1, 1, ... according to the embodiment 1. FIG. 3A and FIG. 3B show example contents of attribute data. FIG. 3B shows contents of data, such as the cruise control data or view data. The beginning of data is the left side in both FIG. 3A and FIG. 3B.

As shown in FIG. 3A, the attribute data includes: identification data (ID) for identifying data contents; data length; information representing the necessity of re-sending data; type of parity added on data; and start time of sending data. Alternatively, it may omit any of the information representing the necessity of re-sending data, the type of parity added on data, and the start time of sending data.

The ID is previously added to each data, similarly to the controller area network (CAN) ID utilized, e.g., for the on-vehicle LAN. Thus, respective ECUs 1, 1, ... can recognize data contents based on the ID. For example, the ID is configured with 1 byte (8 bits). The ID may be considered as the address information specifying respective ECUs 1, 1, ... that are destinations for the sent data. Respective ECUs 1, 1, ... can recognize contents of the sent data based on the ID included in the beginning of attribute data.

For example, the data length represents data size by the byte. For example, 2 bytes are utilized as the data length. In the configuration that lower number is applied as the ID to the data having higher importance, respective ECUs 1, 1, ... can recognize the importance degree of the sent data.

The information representing the necessity of re-sending data is utilized as described below. The controlling unit 10 included in each of ECUs 1, 1, ... receives the attribute data through the receiving circuit 14. When failing to receive data having been sent after the attribute data, the controlling unit 10 can recognize the necessity of re-sending the failed data based on this information included in the received attribute data. For example, the controlling unit 10 can determine whether the re-sending request is required or not, when this information represents not necessary. For example, the information representing the necessity of re-sending data is configured with 1 bit. The controlling unit 10 can send the re-sending request, when this information represents not necessary in the case that the controlling unit 10 has judged to fail receiving the corresponding data sent after the attribute data. Therefore, it is possible to obtain data more securely. After receiving such the re-sending request, the controlling unit 10 of the ECU 1*a* sends the attribute data and the corresponding data, again.

For example, the type of parity represents the type of bit parity, such as the cyclic redundancy check (CRC) or the humming code, added as the error detection code. For example, the type of parity being "1" represents that the high accurate error detection code such as the CRC is added, and the type of parity being "2" represents that the simple error detection code such as the humming code is added. For example, the type of party is configured with 2 bits.

The sending start time represents time for sending the data corresponding to the attribute data. For example, the sending start time represents "after 10 milliseconds", "after 1 milliseconds" and the like. After receiving the attribute data, the controlling unit 10 of the ECU 1 starts receiving data at the time represented by the sending start time in the case of deciding that the data corresponding to the attribute data should be received in accordance with the ID. Then, the controlling unit 10 of the ECU 1 receives the amount of data to be received in accordance with the data length and the type of parity. Therefore, respective ECUs 1, 1, ... can receive desired data, properly. In addition, respective ECUs 1, 1, ... preferably includes timers to detect whether the sending start time comes or not. For example, the sending start time is configured with 2 bytes that represents the time by 1 millisecond.

As shown in FIG. 3B, the parity is added to the data and then the added data is sent. When the information representing the necessity of re-sending data included in the attribute data represents that the data should be re-sent, data are continuously sent at multiple times from the ECU 1 which is the source of the sent data. In this case, the parity is added to every data and then the added data is sent. It is not always required to add the parity to the data and to continuously send the same data at multiple times. However, it is preferred to add the error detection information, such as the parity, and to perform the sending operation at continuous multiple times, for implementing more stable data communication.

FIG. 4 is an explanation view showing example contents of the attribute data sent through the second transmitting circuit 16 by the controlling unit 10 of the ECU 1*a* according to the embodiment 1. The circle in FIG. 4 represents that the particular contents are changed properly in accordance with data contents but are always included in the data, regardless of the importance degree. As shown in FIG. 3A, the attribute data includes information representing the ID, the data length, the type of party and the necessity of re-sending. The controlling unit 10 changes contents of respective information and the setting of the necessity of re-sending, in accordance with the contents of data to be sent later, especially the degree of importance. For example, the attribute data includes: the ID representing wheel speed information; the data length; the type of party representing the addition of high accurate error detection code; and the information representing the positive necessity of re-sending data, in the case that the attribute data corresponds to relatively important data utilized for the cruise control. For example, the attribute data includes: the ID representing the view data; and the data length, in the case that the attribute data corresponds to data having lower importance than the data utilized for the cruise control. Then, the attribute data corresponding to such the data is sent with further including: the type of parity representing the addition of simple error detection code, such as the humming code; and the information representing the negative necessity of re-sending data. In the case that the attribute data corresponds to data not to be re-sent, the attribute data may not include the information representing the necessity of re-sending data.

The controlling unit 10 recognizes the importance degree of the data based on the ID previously added onto each data. For example, when the 8 bits ID represents a value lower than a predetermined value, the data identified by the ID is recognized to be important. On the other hand, when the 8 bits ID represents a value not lower than the predetermined value, the data identified by the ID is recognized to be not important.

Thus, it is possible to avoid the dip frequency effects and to send the attribute data through the second transmitting circuit 16 with the low frequency that is sent more stably. Therefore, the controlling unit 10 can efficiently receive data, since respective ECUs 1, 1, ... can recognize the data contents, the data length, the type of parity and the necessity of re-sending data when receiving the data.

Figure 5:
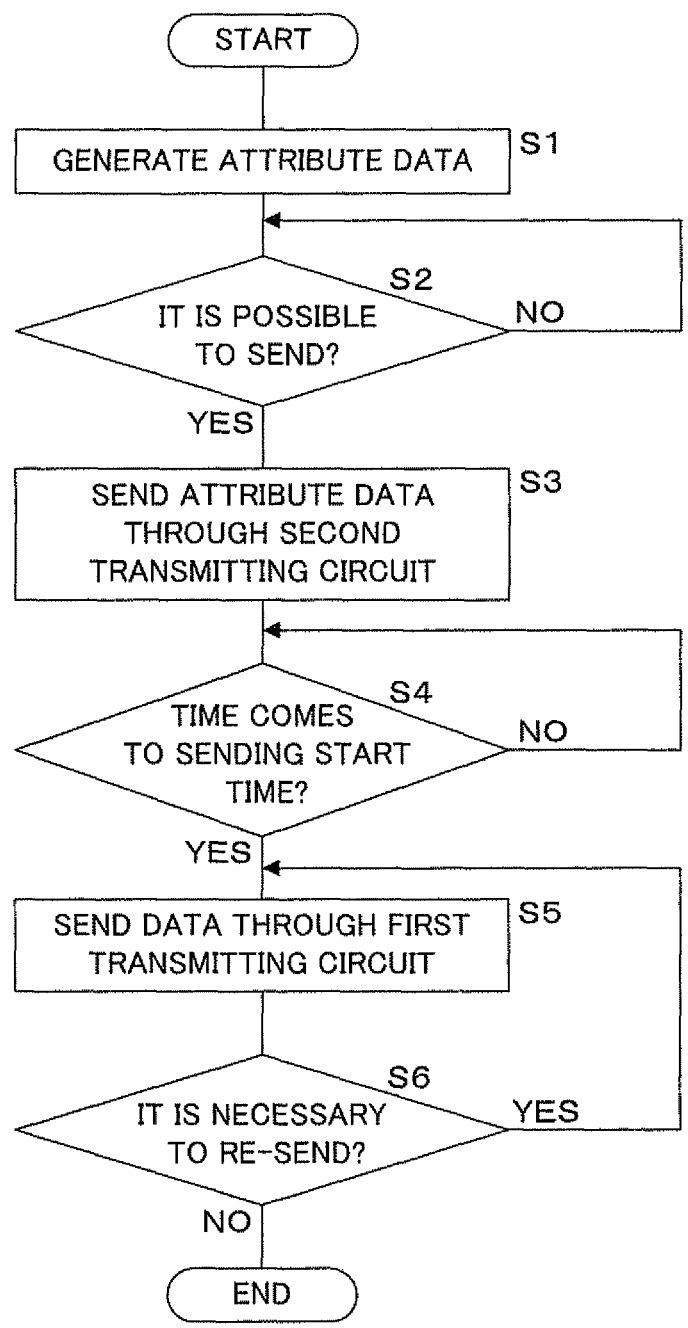
FIG. 5 is a flowchart showing an example of procedure for sending data with a first transmitting circuit and the second transmitting circuit, performed by the controlling unit of the ECU according to the embodiment 1.

FIG. 5 is a flowchart showing an example of procedure for sending data with the first transmitting circuit 15 and the second transmitting circuit 16, performed by the controlling unit 10 of the ECU 1*a* according to the embodiment 1.

When sending data, the controlling unit 10 generates attribute data corresponding to the data to be sent (step S1), and determines whether or not it is possible to send the data through the electric power line 3 (step S2). When having determined that it is not possible to send (S2: NO), the controlling unit 10 returns the procedure to the step S2. When having determined that it is possible to send (S2: YES), the controlling unit 10 sends the generated attribute data with the frequency f2 (9 MHz) through the second transmitting circuit 16 (step S3).

Next, the controlling unit 10 determines, in reference to the internal clock, whether or not the time comes to the sending start time included in the attribute data generated at the step S1 (step S4). When having determined that the time does not come to the sending start time yet (S4: NO), the controlling unit 10 returns the procedure to the step S4. When having determined that the time comes to the sending start time (S4: YES), the controlling unit 10 sends the data to be sent with the frequency f1 (18 MHz) through the first transmitting circuit 15 (step S5). The controlling unit 10 sequentially determines whether or not it is necessary to re-send the data (step S6). When having determined that it is not necessary (S6: NO), the controlling unit 10 completes the procedure.

When having determined that it is necessary (S6: YES), the controlling unit 10 returns the procedure to the step S5 and re-sends the data with the frequency f1 (18 MHz) through the first transmitting circuit 15 (S5). When having determined that it is not required for re-sending further (S6: NO), the controlling unit 10 completes the procedure.

As described above, it is possible to send data with the carrier wave having the frequency f1 and with the carrier wave having the frequency f2, both of which are different from the dip frequency. Therefore, it is possible to send the small data required to be sent surely (attribute data) with the carrier wave having the frequency f2 on which the dip frequency effects are lower, to send the larger data with the carrier wave having the frequency f1 on which the dip effects are lower and which is relatively higher frequency, and to perform the data transmission more efficiently.

The frequencies f1 and f2 are utilized by the first transmitting circuit 15 and the second transmitting circuit 16, respectively, and both of frequencies f1 and f2 are lower than the dip frequency. As described above, the analytical results indicate that the lower level of dip frequency becomes about 19 MHz in the structure of communication system mounted on the motor vehicle where the electric power line 3 connects the ECU 1a to the ECU 1b and the branch line length of the electric power line 3 is limited to be under 4 meters. As the branch line length becomes shorter, for example, 3.5 meters, 3 meters, 2.5 meters, . . . , the dip frequency becomes higher. In short, the dip frequency varies within a band range not less than about 19 MHz, in the case that the 4 meters is set as the upper limit of the branch line length included in the circuit structure of electric power line 3 and the data transmission is implemented through the electric power line 3. Therefore, it is possible to set both the frequencies f1 and f2 of the first and second transmitting circuits 15 and 16 lower than the dip frequency, and avoid the dip frequency effects caused by the PLC communication through the electric power line 3.

Furthermore, the frequency f1 utilized for sending data through the first transmitting circuit 15 is configured to be double of the frequency f2 utilized for sending data through the second transmitting circuit 16. Therefore, it is possible to share the clocking circuit 17 for both the first transmitting circuit 15 and the second transmitting circuit 16, to minimize the ECUs 1, 1, . . . and to reduce the weights of ECUs 1, 1, . . . . Alternatively, it may be configured to utilize the integral multiple wave that is not only double but also triple or quadruple within the band range 2-20 MHz in order to avoid the dip frequency.

The clocking circuit 17 according to the embodiment 1 is illustrated to be included in the communication unit 12. However, the clocking circuit 17 may be alternatively arranged outside the communicating unit 12 and shared by each component, such as the controlling unit 10, of ECUs 1, 1, . . . . In this alternative case, it is possible to further minimize the ECUs with utilizing the frequencies f1 and f2 being demultiple or integral multiple of operation clock frequency.

Embodiment 2

In an Embodiment 2, it is Configured to Transmit Data between the ECUs 1, 1, . . . , and to utilize a format for transmitting the data different from the format utilized in the embodiment 1. The configurations of communication system according to the embodiment 2 are similar to those according to the embodiment 1, thus are provided with similar numerals and are not described in detail. It will be described below about the format of data transmitted by the communicating unit 12.

Figure 6A:
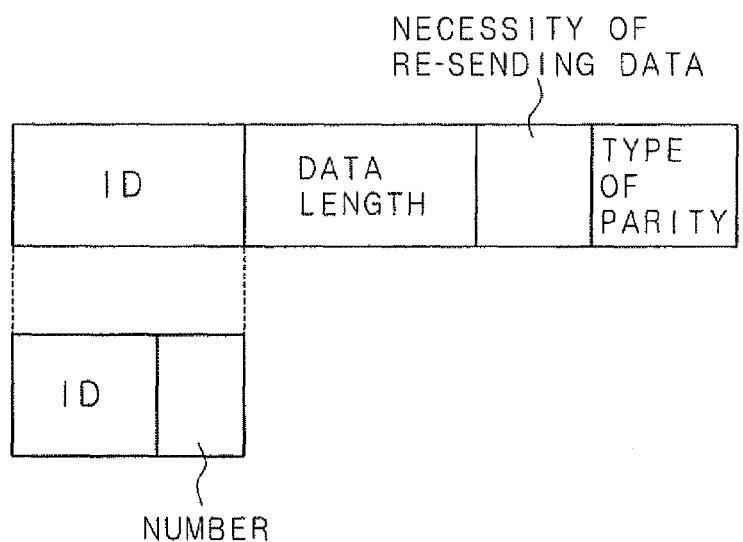
FIG. 6A is an explanation view showing a format of data transmitted between ECUs according to an embodiment 2.
Figure 6B:
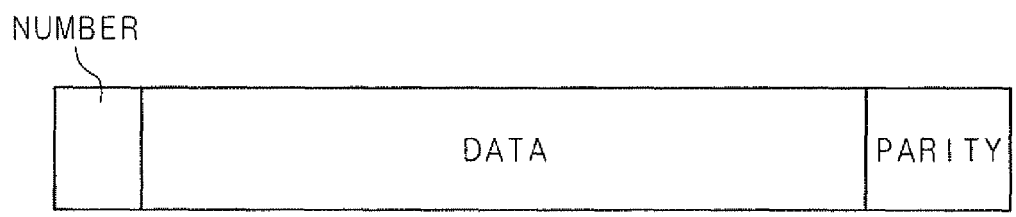
FIG. 6B is an explanation view showing a format of data transmitted between ECUs according to an embodiment 2.

FIG. 6A and FIG. 6B are explanation views showing formats of data transmitted between the ECUs 1, 1, . . . according to the embodiment 2. FIG. 6A shows example contents of attribute data, and FIG. 6B shows example contents of data. In both FIG. 6A and FIG. 6B, the left side in the figure represents the beginning of data.

As shown in FIG. 6A, the attribute data includes: ID for identifying data contents; data length; information representing the necessity of re-sending data; and type of parity. The attribute data shown in FIG. 6A does not include the sending start time, which is included in the attribute data shown in FIG. 3A according to the embodiment 1. Furthermore, the definition of ID according to the embodiment 2 is configured to be different from the definition of ID according to the embodiment 1. The data length, the information representing the necessity of re-sending data and the type of parity according to the embodiment 2 utilize formats similar to those of the embodiment 1, and thus are not described in detail.

In the embodiment 1, for example, the ID is defined to be 8 bits. In the embodiment 2, the 8 bits ID is configured with later 5 bits of ID and 3 bits number unique to each data. The reason is that the later 5 bits of ID is generally enough for identifying each data.

Furthermore, the 3 bits number is added to the beginning of data to be sent in the embodiment 2, as shown in FIG. 6B. This number is configured to match the number included in the beginning of corresponding attribute data.

The controlling unit 10 of ECU 1a according to the embodiment 2 generates the attribute data whose beginning 5 bits represent the later 5 bits of ID and whose following 3 bits represent one among 8 type numbers, and then sends the generated attribute data with the 9 MHz frequency through the second transmitting circuit 16. In the case of sending data later, the controlling unit 10 adds the 3 bits number included in the beginning of corresponding attribute data onto the data to be sent, and then sends the data with the frequency f1 (18 MHz) through the first transmitting circuit 15. The receiver can recognize that the data having the number included in the previously received attribute data at the beginning has contents identified by the ID included in the previously received attribute data. The 3 bits number is an arbitrary number selected from 8 types. The 3 bits number added on the data sent from an ECU 1 is different from the 3 bits number added on the data sent from another ECUs 1, 1, . . . , unless accidental coincidence. Therefore, respective ECUs 1, 1, . . . can receive data whose contents are identified by the ID.

In the embodiment 1, respective ECUs 1, 1, . . . are configured to recognize that the data received from the time represented by the sending start time included in the previously received attribute data has contents identified by the ID included in the previously received attribute data. However, respective ECUs 1, 1, . . . may fail to complete sending the data at the sending start time included in the attribute data. On the contrary, in the embodiment 2, it is possible to recognize contents of data that sent later, due to the coincidence between the number included in the attribute data and the number added to the data, even in the case that the data cannot be received immediately after the attribute data is sent.

It should be noted that the data format is not limited to those described in the embodiments 1 and 2 for transmitting data between the ECUs 1, 1, . . . . For example, the controlling unit 10 may be configured to add the ID onto the beginning of data and then to send the data. For example, it may be configured to prepare information utilized by the receiver for recognizing the relationship between the data sent through the first transmitting circuit 15 and the attribute data sent through the second transmitting circuit 16, and to make the prepared information be included in both or any one of the data and the attribute data.

The embodiments 1 and 2 are configured to send the data through the first transmitting circuit 15 and to send the attribute data corresponding to the data through the second transmitting circuit 16. However, the present invention is not limited to these configurations. It may be configured to further send control data through the second transmitting circuit 16. For example, in the case that the data to be sent has smaller amount, is more important and does not allow digital error, the controlling unit 10 recognizes these facts of the data to be sent and sends through the second transmitting circuit 16.

The embodiments 1 and 2 are configured to send data through the first transmitting circuit 15 or the second transmitting circuit 16, in accordance with the program stored in the ROM included in the controlling unit 10 that may utilize the microcomputer. However, the present invention is not limited to these configurations. The ECU may be configured to perform respective operations, as hardware operations, with utilizing the application specific integrated circuit (ASIC) and the field programmable gate array (FPGA) that are the processing circuits implementing the determination performed by the controlling unit 10 in the embodiments 1 and 2.

The embodiments 1 and 2 are configured to superimpose respective data signal on the carrier waves having different frequencies f1 and f2, and then to send the data. Alternatively, it may be configured to superimpose data on only the carrier wave having the frequency f1 and then to send the data. It is possible to implement relatively stable information transmission, in the case that the AM radio frequency and the dip frequency are avoided for setting the frequency f1.

The embodiments 1 and 2 are configured to set the branch line length of the electric power line 3 not more than 4 meters, included in the communication system, in consideration of the arrangement of ECUs and the number of ECUs. In such the configurations, the dip frequency becomes within the band range not less than 19 MHz. Thus, the embodiments 1 and 2 are configured to set the frequency of carrier wave not more than 20 MHz, in order to avoid the dip frequency effects in this circuit structure, as the carrier wave is utilized for transmitting data. In other words, it is configured to decide the frequency of carrier wave and then to decide the upper limit of branch line length of electric power line 3 included in the communication system. Thus, it may be possible to decide the frequency of carrier wave for transmitting data, and then to decide the upper limit for the configuration of electric power line 3 in consideration of the frequency of carrier wave properly apart from the dip frequency. For example, the frequency of carrier wave is decided to be 12 MHz, in order to avoid the AM radio frequency and the FM radio frequency and further to share the signal having the 24 MHz clock frequency utilized for respective operations including the communication. For this example, it may be configured to utilize the wire harness having the electric power lien 3 where the branch line length is not longer than 4 meters and the branch line contributes in forming the quarter wave open, in order to keep properly away from the dip frequency.

In the case that the frequency of carrier wave is estimated by another components of communication system, e.g., the modulation method and the communication protocol, it is preferred for design purpose to decide the length of electric power line 3, the configuration, the number of branch points, the arrangement of ECUs, and the number of connection, in accordance with the frequency of carrier wave.

Embodiment 3

In an Embodiment 3, the Data to be Transmitted is Configured to conform to the CAN, and the communication is implemented by the conventional CAN communication function (CAN controller) included in each ECU. Furthermore, the embodiment 3 utilizes the ASK as the modulation method for the carrier waves utilized by the first transmitting circuit 15 and the second transmitting circuit 16, although the modulation method is not limited to any method in the embodiments 1 and 2. In addition, although the embodiments 1 and 2 are configured to select one frequency among the two different frequencies f1 and f2 of carrier waves for sending data, the embodiment 3 is configured to utilize 12 MHz carrier wave among the preferable band range 2-20 MHz for sending data, instead of selecting one frequency among the two different frequencies f1 and f2 of carrier waves. Alternatively, the embodiment 3 described below may be configured to select one frequency among two carrier waves having different frequencies in accordance with the type of data to be sent.

It will be described below about the reason that the modulation method is limited to the ASK. The electric power line communication (PLC) performs the communication through the electric power line 3 as the communication line, instead of the twisted-pair line, in order to reduce lines. Furthermore, the communication protocol of the PLC corresponds to the high-speed CAN communication. Then, the communication speed is 500 kbps for transmitting data. As described above, the rate of 500 kbps is close to the AM radio frequency. Thus, it is not possible to directly superimpose the base band onto the electric power line 3. Hence, it is configured to avoid the AM radio frequency and the dip frequency, and perform the modem operation with the carrier wave not less than 2 MHz, in view of the reason described above. In addition, the CAN protocol is utilized for the data transmission performed by the communicating unit. The communication between the ECUs requires the arbitration function of the CSMA/CA, even in the case that the data is sent after modulated by the 12 MHz carrier wave. In other words, the communicating unit normally determines whether or not own currently sending signal matches to the signal currently sent through the electric power line 3. Then, the arbitration makes the communicating unit continue sending the current data for the communication, when own currently sending signal matches to the signal currently sent through the electric power line 3 and further the communicating unit obtains the sending right. The communicating unit determines, 1 bit by 1 bit, whether or not own currently sending signal is sent through the electric power line 3. In the high-speed CAN communication of 500 kbps, it takes about 2 microseconds for 1 bit, and it is required to determine whether the signal is bit "0" or bit "1" sent during 1.4 microseconds, i.e., 70% of 2 microseconds for 1 bit. Thus, it is required to receive the signal within 1.4 microseconds which has been modulated and then sent by the communicating unit. The delay should be under 0.7 microseconds allowed for one-way. Hence, the modulation method is preferred for easily determining whether the bit "0" or the bit "1". In view of this preference, the ASK is suitable which changes the output/non-output of carrier wave based on the digital value (0/1) of sent data. Especially, so-called on-off keying (OOK) modulation is suitable. In this suitable case, the carrier wave is output into the electric power line 3 when the signal is low (0), and the carrier wave is not output into the electric power line 3 when the signal is high (1). Thus, it is easy to determine whether the currently sent signal is the dominant or the recessive of the CAN. Therefore, the delay time can be smaller as much as possible. Furthermore, it is possible to easily implement the electric power line communication even with small hardware and low cost. Because of the reasons described above, the ASK is adopted as the modulation method.

It will be described below about the configurations of communicating unit according to the embodiment 3 that implement data transmission based on the CAN with the ASK described above. The configurations of communication system according to the embodiment 3 are similar to those according to the embodiments 1 and 2, except for detailed configurations included in the communicating unit. For these reasons, the components of the embodiment 3 common to those of the embodiments 1 and 2 are provided with the same numerals and not described in detail.

Figure 7:
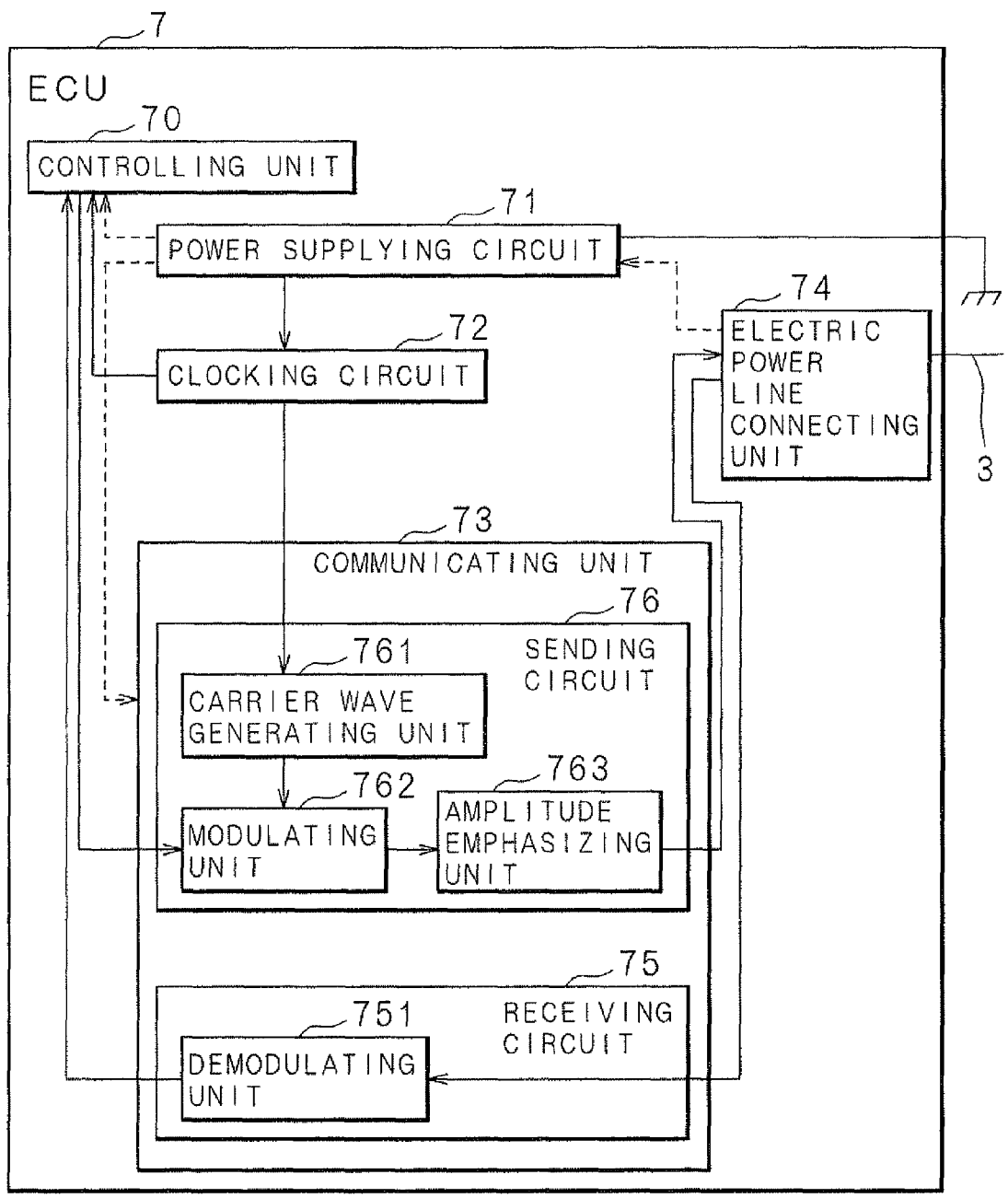
FIG. 7 is a block diagram showing an inner configuration of an ECU included in a communication system according to an embodiment 3.

FIG. 7 is a block diagram showing an inner configuration of the ECU included in the communication system according to the embodiment 3. The communication system according to the embodiment 3 is configured to include plural ECUs 7, 7, . . . . The ECUs 7, 7, . . . are connected to the electric power lines 3, 3, . . ., obtain electric power for working from the battery 4 through the electric power lines 3, 3, . . ., and implement the PLC through the electric power line 3, similarly to the ECU 1, 1, . . . according to the embodiments 1 and 2. The ECUs 7, 7, . . . transmit the control data through the electric power lines 3, 3, . . ., and controls the operations of actuators 2, 2, . . . connected to the electric power lines 3, 3, . . . .

The ECU 7 includes a controlling unit 70, a power supplying circuit 71, a clocking circuit 72, a communicating unit 73, and an electric power line connecting unit 74.

The controlling unit 70 utilizes a processing equipment, such as the central processing unit (CPU) or the micro processing unit (MPU), obtains electric power through the power supplying circuit 71, and controls the data transmission performed by the communicating unit 73 or the operations of another components (not shown). In addition, the controlling unit 70 performs operations for controlling on-vehicle parts, such as the engine or the brake (not shown). In the case of requiring to exchange information between another ECUs 7, 7, . . . for performing these operations, the controlling unit 70 can give the sending data to the communicating unit 73 for sending information to another ECUs 7, 7, . . ., and can obtain information received by the communicating unit 73 from another ECUs 7, 7, . . ., as the receiving data.

The electric power line connecting unit 74 includes: a filtering circuit (not shown) for distributing the electric power supplied through the electric power line 3 toward the power supplying circuit 71; and a filtering circuit (not shown) for applying the carrier wave, sending the data transmitted through the electric power line 3, toward the communicating unit 73.

The power supplying circuit 71 is connected to the controlling unit 70, the clocking circuit 72, the communicating unit 73 and another components (not shown), and supplies electric power to those connected components. For example, the power supplying circuit 71 is configured to receive 12V driving voltage from the battery 4 through the electric power line connecting unit 74 and the electric power line 3, to properly adjust the received 12V driving voltage based on the required amount of voltage for each component, and then to supply adjusted voltage to each component.

The clocking circuit 72 utilizes an oscillator, such as the crystal oscillator, and thus outputs the clock signal having 24 MHz frequency toward the controlling unit 70, the communicating unit 73 and another components (not shown). The controlling unit 70 synchronizes with the clock signal, the integral multiple of clock signal, or the demultiple of clock signal. The communicating unit 73 also synchronizes with the demultiple of clock signal output from the clocking circuit 72.

The communicating unit 73 utilizes the network controller and thus implements the data transmission with another ECUs 7, 7, . . . and actuators 2, 2, . . . . Particularly, the communicating unit 73 performs the sending operation for sending the data given from the controlling unit 72 toward another ECUs 7, 7, . . . in the electric power line communication, and the receiving operation for giving the data sent from another ECUs 7, 7, . . . in the electric power line communication toward the controlling unit 70. The communicating unit 73 includes a receiving circuit 75 and a sending circuit 76. Further, the receiving circuit 75 includes a demodulating unit 751, and the sending circuit 76 includes a carrier wave generating unit 761, a modulating unit 762 and an amplitude emphasizing unit 763.

The demodulating unit 751 of the receiving circuit 75 examines the amplitude of carrier wave given from the electric power line connecting unit 74, and thus determines whether the carrier wave is output or not. Then, the demodulating unit 751 demodulates the received signal into the digital receiving data based on the determination results, and gives the demodulated receiving data to the controlling unit 70. It may be configured to utilize the envelop detection for the demodulation of receiving signal performed by the demodulating unit 751.

The carrier wave generating unit 761 of the sending circuit 76 is configured with: a demultiplying circuit that demultiplies the clock signal given from the clocking circuit 72; and a filtering circuit, such as the band-pass filter. The carrier wave generating unit 761 according to the embodiment 3 generates the sinusoidal signal having 12 MHz frequency, and outputs the generated sinusoidal signal as the carrier wave to the modulating unit 762.

The carrier wave generated by the carrier wave generating unit 761 is given to the modulating unit 762, and the modulating unit 762 modulates the digital sending data given through the given carrier wave from the controlling unit 70, and gives the modulated signal as the sending signal toward the amplitude emphasizing unit 763. The modulating unit 762 outputs the carrier wave when the value of sending data given from the controlling unit 70 is "0", and does not output the carrier wave when the value of sending data given from the controlling unit 70 is "1", in order to modulate the sending data (so-called OOK modulation). The ECU 7 according to the embodiment 3 is configured to send the sending data at the speed 500 kbps, and the sending signal modulated by the modulating unit 762 leads the carrier wave for not less than tens of cycles against 1 bit of sending data "0" given from the controlling unit 70.

The amplitude emphasizing unit 763 is configured to emphasize and then output the amplitude of sending signal given from the modulating unit 762. The emphasized amplitude becomes about 2-3 times larger. As emphasizing the amplitude of sending signal for each bit of sending data "0", the amplitude emphasizing unit 763 emphasizes only the region for some cycle from the beginning of output carrier wave. It will be described later in detail about the amplitude emphasis of carrier wave performed by the amplitude emphasizing unit 763.

The ECU 7 can perform data transmission through the electric power line 3 with another ECUs 7, 7, . . . , because including the communicating unit 73 described above. The electric power line 3 mounted on the motor vehicle is for supplying electric power from the battery 4 to plural ECUs 7, 7, . . . , and thus plural ECUs 7, 7, . . . are connected to the electric power line 3. In the case that the each communicating unit 73 of ECUs 7, 7, . . . connected to the same electric power line 3 concurrently starts the sending operation, plural sending signals collides with each other on the electric power line 3. Hence, each communicating unit 73 of ECUs 7, 7, . . . requires the arbitration operation in order to prevent the collision of sending operations.

Figure 8:
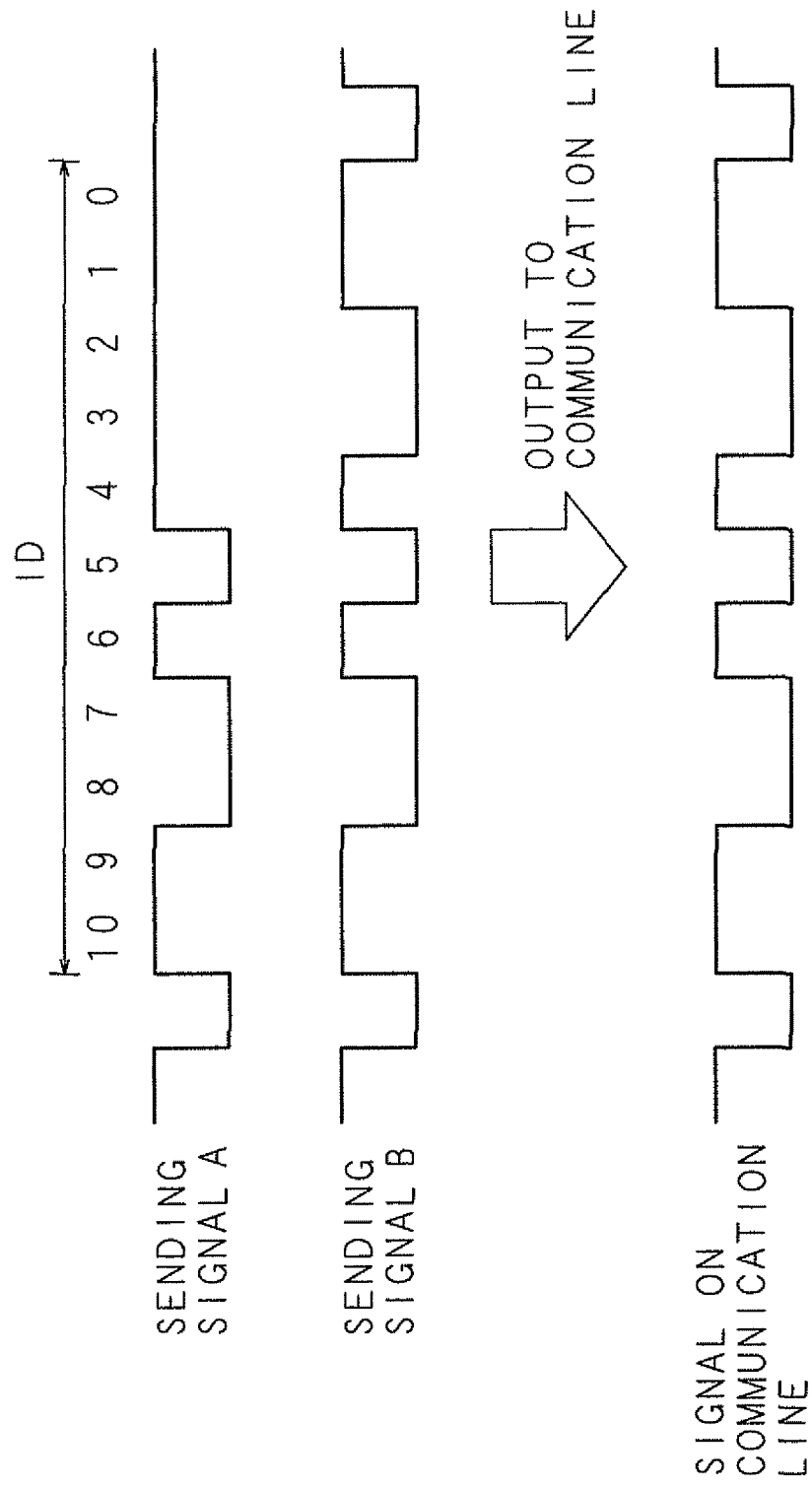
FIG. 8 is a schematic view explaining arbitration for a sending operation.
Figure 9:
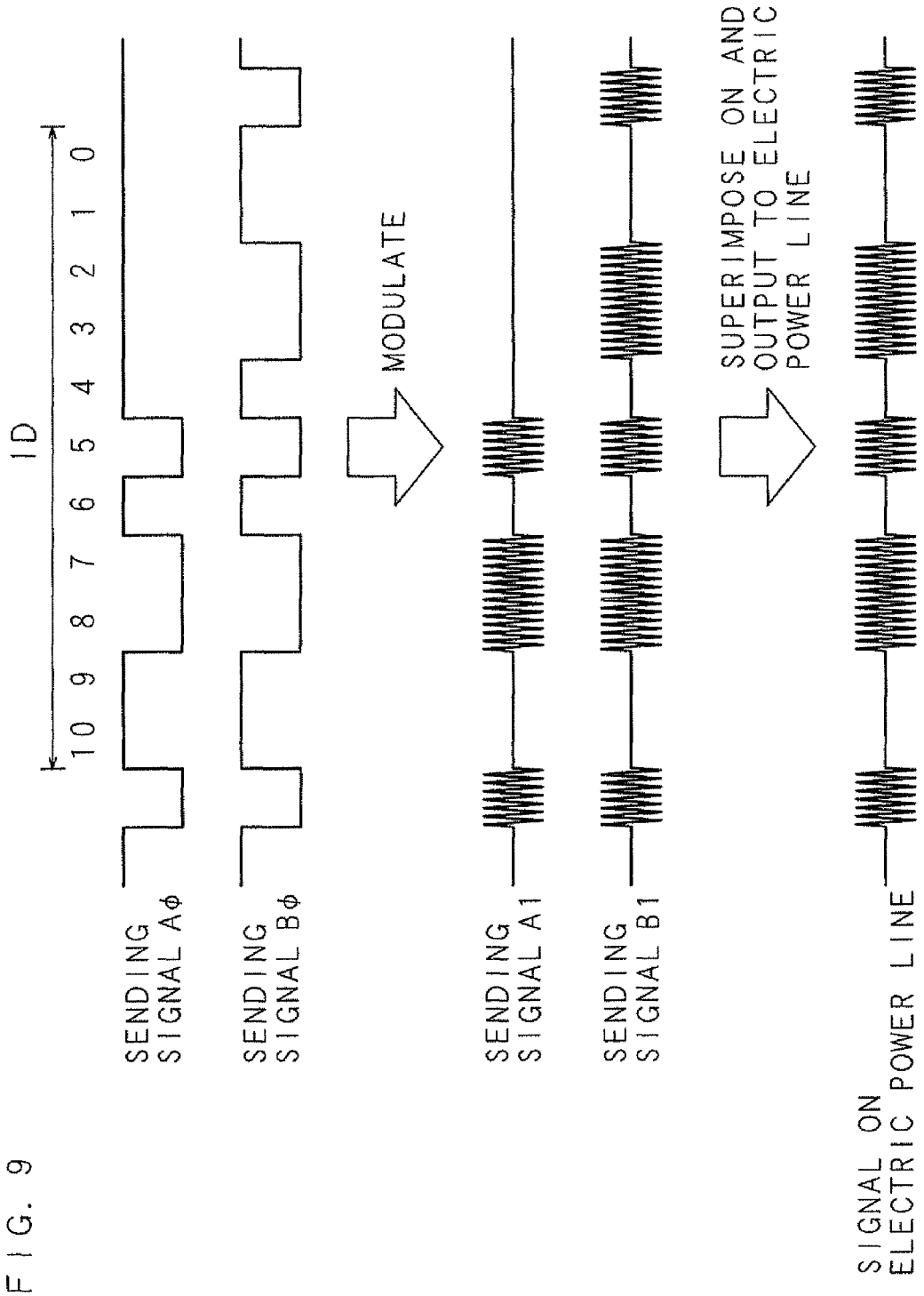
FIG. 9 is a schematic view explaining arbitration for a sending operation.

FIG. 8 and FIG. 9 are schematic views explaining arbitration for the sending operation. FIG. 8 shows the arbitration performed by a conventional communication apparatus corresponding to the CAN, and FIG. 9 shows the arbitration performed by the communication apparatus according to the present invention. In the CAN, a word "frame" is utilized for expressing data transmitted through the communication line, and one frame is configured with plural fields, such as start of frame field, arbitration field, control field, data field, CRC field, acknowledgment (ACK) field and end of frame field. The arbitration field among these fields include 11 bit ID based on the type of data to be transmitted. The communication apparatus utilize the ID as the priority level, and thus performs the arbitration.

For example, the top of FIG. 8 shows a signal waveform of ID portion included in the data concurrently sent by two communication apparatus, one communication apparatus outputs a sending signal A having ID "11001011111", and the other communication apparatus outputs a sending signal B having ID "11001010011". In the CAN, a word "dominant" is utilized for the signal level corresponding to data "0" on the communication line, and a word "recessive" is utilized for the signal level corresponding to data "1" on the communication line. In the case that plural communication apparatuses concurrently output signals toward the communication line and then at least one communication apparatus outputs dominant signal, the signal level on the communication line becomes dominant.

Thus, when the sending signals A and B are concurrently output to the communication line as shown in the top of FIG. 8, the signal on the communication line has the signal waveform shown in the bottom of FIG. 8, i.e., the same signal waveform as the sending signal B. Each communication apparatus checks the signal level for each bit on the communication line, after outputting the signal to the communication line. In the case that the signal level on the communication line is "dominant" corresponding to data "0" although the communication apparatus has output the recessive signal corresponding to data "1", the communication apparatus stops the sending operation and starts the receiving operation. In the case that the signal level on the communication line is the same with the signal level of output signal, the communication apparatus continues the sending operation. In this embodiment, the communication apparatus outputs the sending signal A having recessive for the third bit of ID, detects that the signal level on the communication line is dominant for the third bit of ID, stops the sending operation and then starts the receiving operation. Another communication apparatus outputs the sending signal B, detects that the signal level on the communication line is the same as the signal level of the output sending signal B, and then continues the sending operation. These operations are performed by respective communication apparatuses. Therefore, it is possible to implement the arbitration based on the CAN.

The ECU 7, which is the communication apparatus according to the present invention, gives the sending data from the controlling unit 70 to the communicating unit 73, and the data format of sending data is based on the conventional CAN as shown in the top of FIG. 9. In this embodiment, the controlling unit 70 of first ECU 7 gives the sending data represented by sending signal Aφ to the communicating unit 73, the controlling unit 70 of second ECU 7 gives the sending data represented by sending signal Bφ to the communicating unit 73. It should be noted that the sending signals Aφ and Bφ shown in the top of FIG. 9 are the same as the sending signals A and B in the top of FIG. 8.

After obtaining the sending data from the controlling unit 70, the communicating unit 73 performs the modulation of the sending data with the modulating unit 762. The center of FIG. 9 shows sending signals A1 and B1 into which the modulating unit 762 of each ECU 7 respectively modulates the sending signals Aφ and Bφ. For implementing the modulation, the modulating unit 762 changes the output/non-output of carrier wave generated by the carrier wave generating unit 761 in accordance with the value of sending data obtained from the controlling unit 72. Thus, the modulating unit 762 outputs the carrier wave for the data "0" of sending data, but does not output the carrier wave for the data "1" of sending data.

After the sending signals A1 and B1 are generated through the modulation performed by the modulating unit 762 and then the amplitude emphasizing unit 763 emphasizes the amplitude of sending signals A1 and B1, the sending signals A1 and B1 are superimposed on and output to the electric power line 3 through the electric power line connecting unit 74. The bottom of FIG. 9 shows the signal waveform on the electric power line 3, in the case that the sending signals A1 and B1 are concurrently output from the first ECU 7 and the second ECU 7 and superimposed on the electric power line 3 (it should be noted that the emphasis of amplitude is not shown and that simplified signal waveform is shown in the FIG. 9). As shown in FIG. 9, the signal on the electric power line 3 is almost the same as the sending signal B1.

After outputting the signal to the electric power line 3, the communicating unit 73 of respective ECUs 7, 7, . . . checks the existence of carrier wave on the electric power line 3 for each bit of sending data. In the case that the communicating unit 73 detects the carrier wave corresponding to the data "0" on the electric power line 3 even for the bit corresponding to the data "1" for which the communicating unit 73 outputs the carrier wave, in other words, in the case that the signal on the electric power line 3 is different from the signal sent by the communicating unit 73, the communicating unit 73 stops the sending operation and starts the receiving operation. In the case that the signal on the electric power line 3 is the same as the signal sent by the communicating unit 73, the communicating unit 73 continues the sending operation. In this embodiment, the first ECU 7 sends the sending signal A1, detects the difference of signal for the third bit of ID on the electric power line 3 on the electric power line 3, stops the sending operation and then starts the receiving operation. In addition, the second ECU 2 sends the sending signal B1, detects no-difference of signal on the electric power line 3, and continues the sending operation.

These operations are performed by the communicating unit 73 of respective ECUs 7, 7, . . . , and thus it is possible to implement the arbitration similarly to the CAN. Therefore, it is possible to make the transmitted data, which is given and taken between the controlling unit 70 and the communicating unit 73 of ECU 7, be conformed to data format based on the CAN.

The signal output on the electric power line 3 is separated as the receiving signal from the electric power line 3 by the electric power line connecting unit 74 and then given to the demodulating unit 751. The demodulating unit 751 cyclically determines the existence of carrier wave included in the receiving signal, demodulates the receiving signal into receiving data configured with digital values, and gives the receiving data to the controlling unit 70. The demodulating unit 751 determines whether the receiving signal includes the carrier wave or not, in accordance with determining whether the signal level of receiving signal is beyond the threshold value or not.

Figure 10:
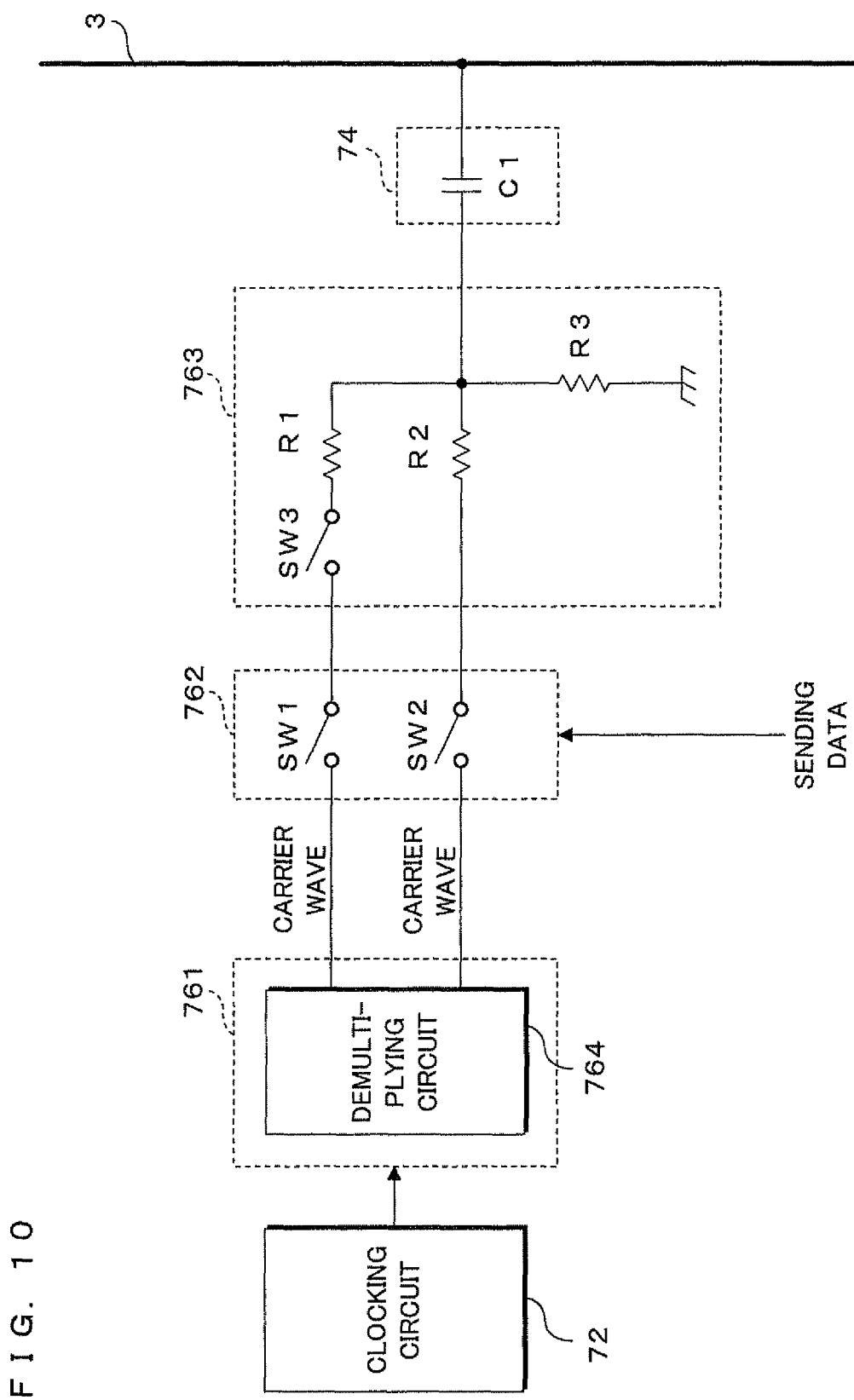
FIG. 10 is a schematic view showing a circuit configuration for a signal sending operation performed by a communicating unit of an ECU.

Next, it will be described about the amplitude emphasis of sending signal performed by the amplitude emphasizing unit 763 of the communicating unit 73. FIG. 10 is a schematic view showing the circuit configuration for the signal sending operation performed by the communicating unit 73 of the ECU 7. FIG. 10 shows the simplified circuit structures of carrier wave generating unit 761, modulating unit 762 and amplitude emphasizing unit 763 of sending circuit 76 included in the communicating unit 73, and the simplified circuit structure of electric power line connecting unit 74. Although each component in FIG. 10 is illustrated with a graphical symbol for the electrical part, the present invention is not limited to the structure configured with the analog circuits. It is possible to configure the same structure with the digital circuits, and thus minimize the circuit size with utilizing a microcomputer for the conventional clocking circuit, the filtering circuit and the calculating circuits.

The carrier wave generating unit 761 generates the carrier wave with utilizing the demultiplying circuit 764 for demultiplying the signal obtained from the clocking circuit 72, and outputs the generated carrier wave to the modulating unit 762. In the embodiment 3, the clocking circuit 72 outputs the 24 MHz clock signals for operation standard utilized by each component of ECU 7. Since the demultiplying circuit 764 is configured to demultiple the signal to be half, the carrier wave generating unit 761 can output the 12 MHz carrier wave. The carrier wave generating unit 761 outputs two carrier waves to the modulating unit 762, which have the same frequency and the same phase with each other.

The modulating unit 762 obtains two carrier waves from the carrier wave generating unit 761, and changes the output/non-output of these carrier waves with utilizing the switches SW1 and SW2. The opening/closing of switch SW1 is linked with the opening/closing of switch SW2. When the switch SW1 is opened, the switch SW2 is also opened. When the switch SW1 is closed, the switch SW2 is also closed. When the sending data is data "0" obtained from the controlling unit 70, the modulating unit 762 closes the switches SW1 and SW2. When the sending data is data "1" obtained from the controlling unit 70, the modulating unit 762 opens the switches SW1 and SW2. Thus, the output/non-output of carrier wave can be changed and the modulation can be performed on the sending data. In addition, the modulating unit 762 generates two modulation signals by the two switches SW1 and SW2, and outputs the two modulation signals to the amplitude emphasizing unit 763.

The amplitude emphasizing unit 763 is configured to emphasize the amplitude based on the two modulation signals obtained from the modulating unit 762, and output one modulation signal having the emphasized amplitude to the electric power line connecting unit 74. Thus, the amplitude emphasizing unit 763 includes: two input terminals into which the two modulation signals are input by the modulating unit 762; and one output terminal from which a signal is output to the electric power line connecting unit 74. One of input terminals is connected to the output terminal through a switch SW3 and a resistance R1, and the other of input terminals is connected to the output terminal through a resistance R2. The resistances R1 and R2 are connected through a resistance R3 to the ground at those output sides, respectively.

For each bit of sending data given from the controlling unit 70, the amplitude emphasizing unit 763 closes the switch SW3 during only a predetermined period from the beginning of data (e.g., period corresponding to a few cycles of carrier wave), and opens the switch SW3 during a period being until the following data is given later. In the case that the switch SW3 is opened, the amplitude emphasizing unit 763 outputs only the modulation signal obtained through the switch SW2 of the modulating unit 762. Thus, the modulation signal obtained from the modulating unit 762 is converted to have the amplitude corresponding to the resistance ratio between the resistance R2 and the resistance R3, and then the converted modulation signal is output. On the other hand, in the case that the switch SW3 is closed, the modulation signal obtained through the switch SW1 is superimposed on the modulation signal obtained through the switch SW2 of the modulating unit 762. Therefore, the amplitude of modulation signal is emphasized in accordance with the resistance ratio between the resistances R1, R2 and R3. The signal output from the amplitude emphasizing unit 763 is given to the electric power line connecting unit 74, superimposed on the electric power line 3 through the capacitor C1 of the electric power line connecting unit 74, and then output.

Figure 11:
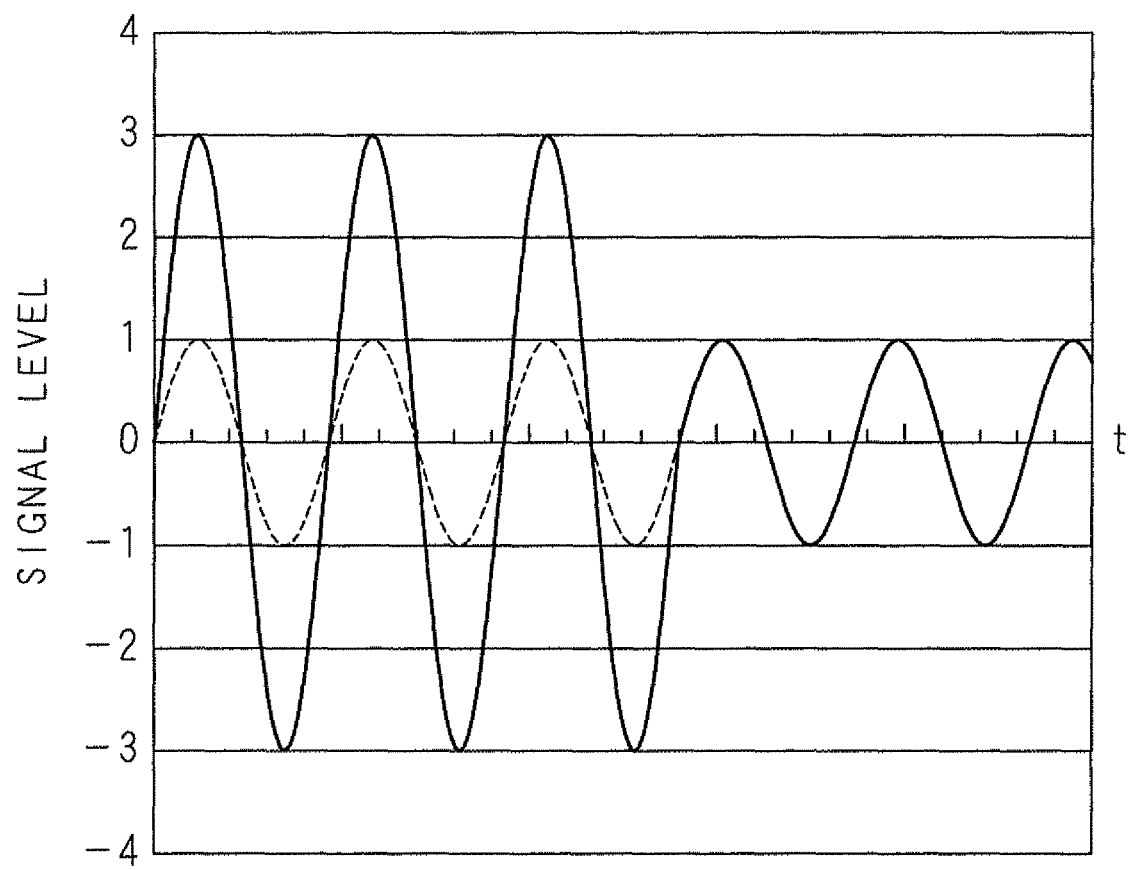
FIG. 11 is a schematic view explaining an amplitude emphasis effect performed by an amplitude emphasizing unit.
Figure 12:
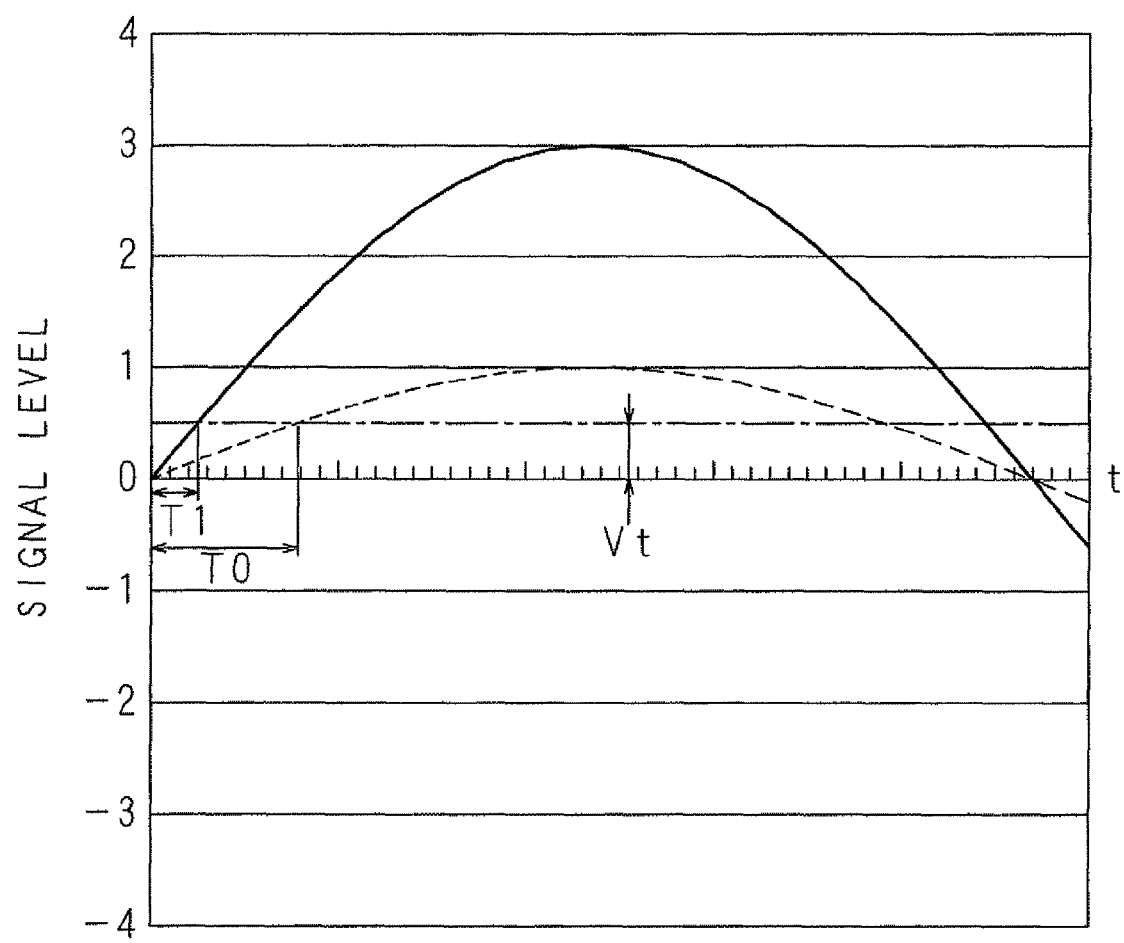
FIG. 12 is a schematic view explaining an amplitude emphasis effect performed by the amplitude emphasizing unit.

FIG. 11 and FIG. 12 are schematic views explaining the amplitude emphasis effect performed by the amplitude emphasizing unit 763, and show for the comparison: a signal waveform whose amplitude is emphasized by the amplitude emphasizing unit 763 (solid line in these figures); and a signal waveform whose amplitude is not emphasized by the amplitude emphasizing unit 763 (broken line in these figures). The signal level on the Y-axis represents the ratio based on the signal level of signal on which the amplitude emphasis is not performed. In these figures, the amplitude emphasizing unit 763 emphasizes the signal level to be larger three times during only the period for three cycles of carrier wave. The waveform shown in FIG. 12 is enlarged on the waveform shown in FIG. 11 during the period for half a cycle of carrier wave from the beginning (time t=0).

In the case that the communicating unit 73 of sender ECU 7 superimposes and sends the signal whose amplitude is emphasized as shown in these figures toward the electric power line 3, the communicating unit 73 of receiver ECU 7 utilizes the electric power line connecting unit 74 for separating this signal from the electric power line 3, receives the separated signal as the receiving signal, and gives the receiving signal to the demodulating unit 751 of the receiving circuit 75. The demodulating unit 751 determines the existence of carrier wave, in accordance with determining whether the signal level of receiving signal is more than the threshold Vt or not. In these figures, the threshold Vt is configured to be about a half amplitude of the signal whose amplitude is not emphasized (see alternate long and short dash line in FIG. 12).

In the case that time period is illustrated to be "T0" until the signal level exceeds over the threshold Vt for the starting time of signal whose amplitude is not emphasized, and that time period is illustrated to be "T1" until the signal level exceeds over the threshold Vt for the starting time of signal whose amplitude is emphasized, the T1 becomes about one-third of the T0. In other words, it is possible to perform the determination of carrier wave existence at early timing, which is performed when the demodulating unit 751 of communicating unit 73 demodulates the receiving signal. Therefore, it is possible to accelerate the demodulation operation performed by the demodulating unit 751, and implement the high-speed communication performed through the electric power line 3 by the communicating unit 73.

As being the communication apparatus according to the present invention, the ECU 7 has the configurations described above, utilizes the carrier wave generating unit 761 for generating the carrier wave corresponding to the predetermined cycle, outputs the carrier wave when obtaining the sending data having the value "0" from the controlling unit 70, and does not output the carrier wave when obtaining the sending data having the value "1" from the controlling unit 70. Furthermore, the modulating unit 762 modulates the sending data, and the modulated signal is superimposed on and sent to the electric power line 3. Thus, it is possible to provide the priority of signal corresponding to the data "0" onto the signal transmitted through the electric power line 3, similarly to the CAN. Hence, the communicating unit 73 of ECU 7 can arbitrate similarly to the CAN, for sending between the plural ECUs 7, 7, . . . . Therefore, it is possible to ease the development of ECU having the function of electric power line communication, reduce the number of communication lines, such as CAN cables, which is required for the motor vehicle mounting the ECU according to the present invention, and reduce the weight of wire harness.

The communicating unit 73 is configured to utilize the amplitude emphasizing unit 763 for emphasizing the amplitude of modulated signal, against each bit of sending data, during a predetermined period from the beginning of sending signal, to superimpose the emphasized sending signal from the sending circuit 76 through the electric power line connecting unit 74 on the electric power line 3 and to send the superimposed sending signal. Thus, when another ECU 3 receives this signal, the demodulating unit 751 of the receiving circuit included in said another ECU 3 can determine at earlier timing the existence of carrier wave included in the receiving signal. Therefore, it is possible to implement the high-speed communication through the electric power line 3. Furthermore, it is possible to reduce the increasing of consumed electric power and of noise, which are caused by the communication, since it is configured to emphasize the amplitude for a part of sending signal.

In the embodiments, it is illustrated to be 12 MHz frequency of carrier wave generated by the carrier wave generating unit 761. This illustration is an example, and the present invention is not limited to this illustration. It may be configured to generate the carrier wave having the other frequency. In addition, although the carrier wave generated by the carrier wave generating unit 761 is illustrated to have the sinusoidal wave, the present invention is not limited to this illustration. It may be configured to generate the carrier wave having the other waveform. In addition, the communicating unit 73 is illustrated to utilize the modulating unit 762 for modulating the sending data obtained from the controlling unit 70 and to utilize the amplitude emphasizing unit 763 for emphasizing the amplitude of modulated signal. However, the present invention is not limited to this illustration. It may be configured to utilize the amplitude emphasizing unit 763 for emphasizing the amplitude of carrier wave generated by the carrier wave generating unit 761, and to utilize the modulating unit 762 for modulating the sending data with the carrier wave whose amplitude has been emphasized.

In the embodiment 3, it is configured to send data with one carrier wave having 12 MHz frequency. In the case that two carrier waves having different frequencies should be selected as shown in the embodiments 1 and 2, it may provide with a second sending circuit other than the sending circuit 76, utilize the demultiplying circuit of second sending circuit for demultiplying the 24 MHz clock signal by 4 to generate the frequency f1=6 MHz and the frequency f2=12 MHz, modulate the data signal based on ASK with the carrier waves having two different frequencies f1 and f2, and then send the modulated data signal.

Embodiment 4

Figure 13:
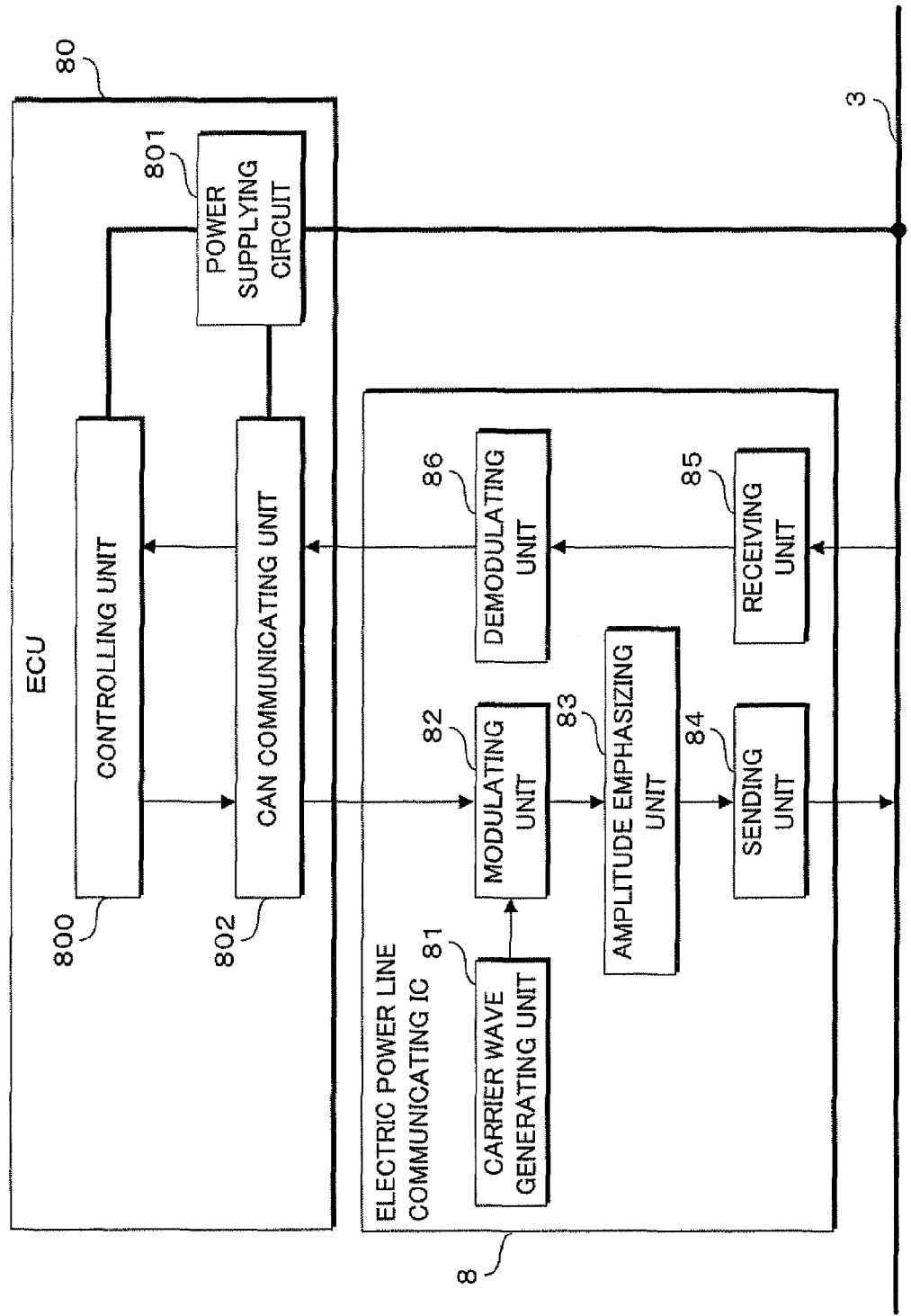
FIG. 13 is a block diagram showing a configuration of a communication apparatus according to an embodiment 4.

In the Embodiments 1, 2 and 3 Described Above, the ECU 1 or the ECU 7 is configured to internally include the communicating unit 73 that performs the electric power line communication. However, the present invention is not limited to such the configuration. As described below, it may be configured to utilize a single integrated circuit (IC) for independently performing the electric power line communication. FIG. 13 is a block diagram showing a configuration of a communication apparatus according to the embodiment 4. In the embodiment 4, the communication apparatus according to the present invention is an electric power line communicating IC 8 that intervenes between a CAN communicating unit 802 of ECU 80 and the electric power line 3 and implements the electric power line communication, as the ECU 80 has a function for communicating on the basis of the CAN.

The ECU 80 includes the CAN communicating unit 802 for communicating on the basis of the CAN. The CAN communicating unit 802 utilizes the CAN controller for sending the sending data obtained from a controlling unit 800, such as the CPU, on the basis of the CAN. Furthermore, the CAN communicating unit 802 utilizes the CAN controller for receiving data sent from another ECU on the basis of the CAN and then gives the received data to the controlling unit 800. Such the CAN communicating unit 802 is often provided to a microcomputer of ECU mounted on the motor vehicle, and connected to the communication line, such as the CAN bus, for the communication. Therefore, there are advantages that the existing equipments can be utilized without modifying.

The electric power line communicating IC 8 includes a carrier wave generating unit 81, a modulating unit 82, an amplitude emphasizing unit 83, a sending unit 84, a receiving unit 85, a demodulating unit 86 and the like, as intervening between the CAN communicating unit 802 of ECU 80 and the electric power line 3. Each component of electric power line communicating IC 8 corresponds to each component included in the communicating unit 73 according to the embodiment 3. The carrier wave generating unit 81 of electric power line communicating IC 8 may internally include the clocking circuit or may receive the clock signal from the ECU 80.

The electric power line communicating IC 8 utilizes the modulating unit 82 for modulating the sending data output by the CAN communicating unit 802 of ECU 80 with utilizing the carrier wave obtained from the carrier wave generating unit 81, utilizes the amplitude emphasizing unit 83 for emphasizing the amplitude, and utilizes the sending unit 84 for superimposing and sending the signal to the electric power lien 3. In addition, the electric power line communicating IC 8 utilizes the receiving unit 85 for receiving the signal superimposed and sent to the electric power line 3 from another ECU, utilizes the demodulating unit 86 for demodulating the receiving signal, and then gives the demodulated receiving data to the CAN communicating unit 802 of ECU 80.

As described above, the CAN communicating unit 802 of ECU 80 is connected through the electric power line communicating IC 8 to the electric power line 3, without being connected to a communication line, such as the CAN bus. The ECU 80 utilizes the CAN communicating unit 802 for performing the communication based on the conventional CAN, regardless whether being connected to the communication line or to the electric power line, and then can implement the electric power line communication through the electric power line 3. Therefore, it is possible to add the function of electric power line communication implemented by the electric power line communicating IC 8 onto the conventional ECU 80 having the communication function based on the CAN.

The arbitration for the sending operation may be performed by the electric power line communicating IC 8 or the CAN communicating unit 802. The electric power for working the electric power line communicating IC 8 may be directly obtained from the electric power line 3 by the electric power line communicating IC 8, or may be supplied from a power supplying circuit 801 of ECU 80 to the electric power line communicating IC 8. In FIG. 13, the ECU 80 is illustrated to be connected to the electric power line 3 and to obtain the electric power directly from the electric power line 3. However, the electric power line communicating IC 8 may be configured to internally include the function of electric power line connecting unit 13, 74 that separates from the electric power line 3 into the carrier wave sending data and the electric power. In this configuration, the power supplying circuit 801 of ECU 80 obtains the electric power from the electric power line 3 through the electric power line communicating IC 8.

Alternative Embodiment

As described in the embodiment 3, the circuit size may be increased in the case that the analog circuit structure is utilized for the communicating unit implementing the electric power line communication. Especially, the receiving circuit requires a bandpass filter, an envelope detecting circuit utilizing a rectification circuit and a lowpass filter, an amplitude determining circuit, and a diode. The bandpass filter separates a frequency, e.g., within a band range near 12 MHz, avoiding the AM radio frequency and the dip frequency. Especially, the circuit size is increased in accordance with the diode, and a capacitor utilized for an integrating circuit of the lowpass filter.

Figure 14:
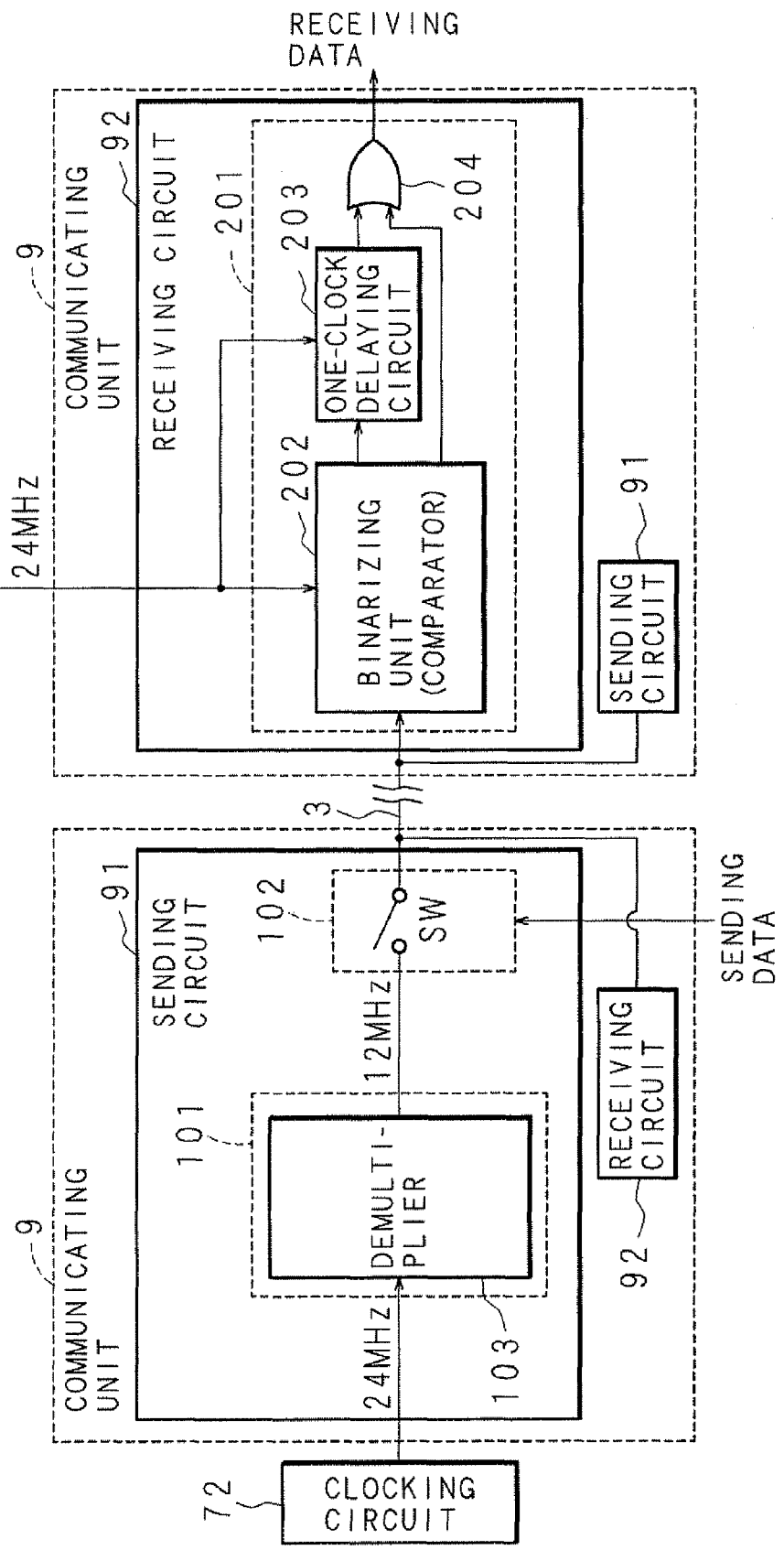
FIG. 14 is a block diagram showing a sending circuit and a receiving circuit of a communicating unit according to an alternative embodiment.
Figure 15:
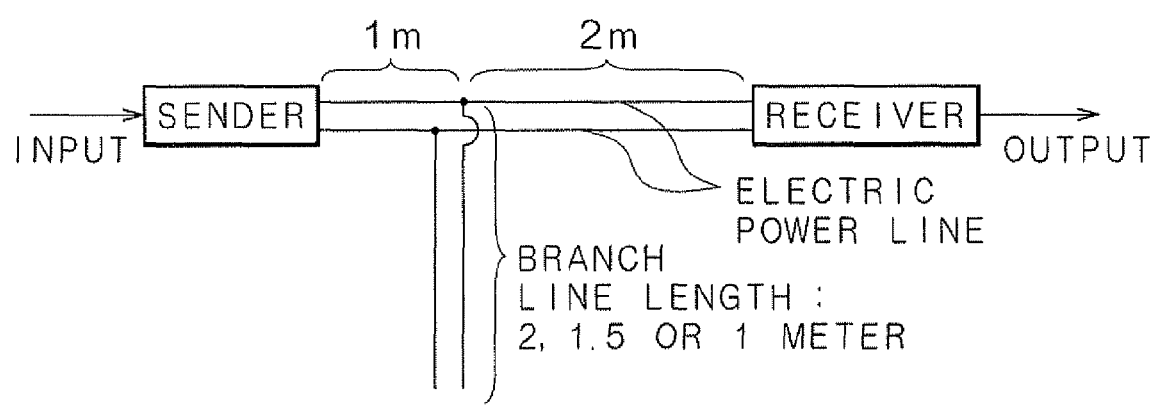
FIG. 15 is an explanation view showing a configuration at a time measuring a dip frequency.

Therefore, it is possible to utilize the digital circuit as shown in FIG. 14, especially the existing logic circuit, for the microcomputer included in the ECU, in order to implement the configuration. It will be described below about an example in the case that the communicating unit 73 according the embodiment 3 is replaced to a communicating unit 9 utilizing the digital circuit. Thus, the components other than the communicating unit 9 are provided with numerals similar to those of embodiment 3, and are not described in detail.

FIG. 14 is a block diagram showing a sending circuit 91 and a receiving circuit 92 of the communicating unit 9 according to an alternative embodiment. The sending circuit 91 includes a carrier wave generating unit 101 and a modulating unit 102. It is omitted about the electric power line connecting unit and the amplitude emphasizing unit to explain and to illustrate. The receiving circuit 92 includes the demodulating unit 201. The clocking circuit 72 is configured independently from the communicating unit 9, and outputs the clock signal utilized for operations of respective components including the communicating unit.

In the sending circuit 91, the 24 MHz clock signal output from the clocking circuit 72 is demultiplied by a demultiplier 103 to be 12 MHz carrier wave and then the 12 MHz carrier wave are output to the modulating unit 102 by the carrier wave generating unit 101. The modulating unit 102 outputs the modulated signal through a SW changing the output/non-output of carrier wave based on 1/0 bit of sending data.

The demodulating unit 201 of receiving circuit 92 utilizes a binaryzing unit 202, an one-clock delaying circuit 203 and an OR circuit 204. Existing logic circuits are utilized as the hardware of ECU 7 for these components.

The binarizing unit 202 synchronizes with the 24 MHz carrier wave input from the clocking circuit 72, and then samples the carrier wave. As the 24 MHz is twice of 12 MHz which is the frequency of carrier wave, the sampling is performed at the twice speed. The sampled result is divided into two signals, and the two signals are output from the binarizing unit 202. One of signals is input into the one-clock delaying circuit 203 that causes one-clock delay for the sampling frequency. It is configured to input both of the sampling signal directly output as the sampled result by the binarizing unit 201 and the sampling signal caused one sampling clock delay by the one-clock delaying circuit 203, into the OR circuit 204 to obtain the OR. Thus, it is configured to output high (1) through the OR circuit 204, except for the case that low (0) is output at continuous two times for the carrier wave.

These configurations can implement the detecting circuit with the reduced circuit size in comparison with the configurations utilizing the diode, the resistance and the capacitor. As described above, the detecting circuit can be implemented with the existing logic circuit as the hardware of ECU. Thus, it is not required to prepare the PLC communicating unit with the analog circuits. Therefore, it is possible to reduce the size of ECU, and to implement the PCL communication system with saving the cost. Although there is delay time for determining dominant or recessive through the path from the sending circuit 91 to the receiving circuit 92, the delay time even in the configuration shown in FIG. 14 is similar to the delay time in the envelope detection method utilizing the analog circuit. Furthermore, there are advantages for the flexibility corresponding to the following digital signal operation performed by the controlling unit 70, because of the digital operation utilized for the implementation.

In the embodiments 1-4, the communication system is explained to be mounted on the motor vehicle, as an example. Not only the on-vehicle system, the present invention can be utilized for the system controlling plural linked apparatuses in many fields, such as the factory automation field.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A communication apparatus that can be connected to an electric power line, comprising:
    an electric power obtaining unit that obtains an electric power through the electric power line;
    a data communicating unit that sends and receives data through the electric power line; and
    a deciding unit that decides a sending frequency utilized for the data sent by the data communicating unit; wherein
    the sending frequency decided by the deciding unit is a frequency lower than a dip frequency expected in accordance with a circuit structure of the electric power line, and
    the communication apparatus controls the data communicating unit and the deciding unit with utilizing the electric power obtained by the electric power obtaining unit.

2. The communication apparatus according to claim 1, further comprising:
    an attribute data generating unit that generates an attribute data for a data to be sent by the data communicating unit, wherein
    the deciding unit decides a first sending frequency utilized for the data to be sent and a second sending frequency utilized for the attribute data,
    the first sending frequency is a frequency different from the second sending frequency,
    the data communicating unit sends the data to be sent with utilizing the first sending frequency, and
    the data communicating unit sends the attribute data with utilizing the second sending frequency.

3. The communication apparatus according to claim 1, further comprising:
    a data signal receiving unit that receives a data signal for a data currently being sent to the electric power line;
    a determining unit that determines whether or not the data signal received by the data signal receiving unit represents a data currently being sent by the data communicating unit; and
    an arbitrating unit that continues a sending operation of the data currently being sent by the data communicating unit when the determining unit determines that the data signal received by the data signal receiving unit represents the data currently being sent by the data communicating unit, and that suspends the sending operation when the determining unit determines that the data signal received by the data signal receiving unit does not represent the data currently being sent by the data communicating unit.

4. The communication apparatus according to claim 1, further comprising:
    a modulating unit that modulates the data to be sent by the data communicating unit with utilizing an ASK, in accordance with a bit string of the data to be sent.

5. The communication apparatus according to claim 2, wherein
    the first sending frequency is integral multiple of the second frequency.

6. The communication apparatus according to claim 2, wherein
    the attribute data includes at least one information among an identification information for identifying contents of the data to be sent, an importance degree information for recognizing a degree of importance, a data length information for recognizing a data length, and a time information for recognizing an estimated start time of a sending operation.

7. The communication apparatus according to claim 2, further comprising:
    an adding unit that adds an error detection information to the data to be sent, wherein
    the data communicating unit sends the data to be sent on which the error detection information is added.

8. The communication apparatus according to claim 3, further comprising:
    an amplitude emphasizing unit that emphasizes an amplitude of a carrier wave sent by the data communicating unit.

9. The communication apparatus according to claim 8, wherein
    the amplitude emphasizing unit superimposes a signal, which has a cycle and phase similar to a cycle and phase of the carrier wave sent by the data communication unit, onto the carrier wave.

10. A communication system that includes a communication apparatus connected to another communication apparatus through an electric power line, comprising:
    an electric power obtaining unit that obtains an electric power through the electric power line;
    a data communicating unit that sends and receives data between the communication apparatus and said another communication apparatus connected with each other through the electric power line; and
    a deciding unit that decides a sending frequency utilized for the data sent by the data communicating unit; wherein
    the sending frequency decided by the deciding unit is a frequency lower than a dip frequency expected in accordance with a circuit structure of the electric power line, and
    the communication system controls the data communicating unit and the deciding unit with utilizing the electric power obtained by the electric power obtaining unit.

11. The communication system according to claim 10, wherein
    the dip frequency expected in accordance with the circuit structure of the electric power line is not less than 20 MHz.

12. The communication system according to claim 10, wherein
    the electric power line has a branch point leading toward a terminal which configures a quarter wave open stub, and
    a length from the branch point to the terminal is not more than 4 meters.

13. The communication system according to claim 10, further comprising:
    an attribute data generating unit that generates an attribute data for a data to be sent by the data communicating unit, wherein
    the deciding unit decides a first sending frequency utilized for the data to be sent and a second sending frequency utilized for the attribute data,
    the first sending frequency is a frequency different from the second sending frequency,
    the data communicating unit sends the data to be sent with utilizing the first sending frequency, and
    the data communicating unit sends the attribute data with utilizing the second sending frequency.

14. The communication system according to claim 10, further comprising:
    a modulating unit that modulates the data to be sent by the data communicating unit with utilizing an ASK, in accordance with a bit string of the data to be sent.

15. The communication system according to claim 10, wherein
- a data signal receiving unit that receives a data signal for a data currently being sent from the communication apparatus to the electric power line;
- a determining unit that determines whether or not the data signal received by the data signal receiving unit represents a data currently being sent from said another communication apparatus by the data communicating unit; and
- an arbitrating unit that continues a sending operation of the data currently being sent from said another communication apparatus by the data communicating unit when the determining unit determines that the data signal received by the data signal receiving unit represents the data currently being sent by the data communicating unit, and that suspends the sending operation when the determining unit determines that the data signal received by the data signal receiving unit does not represent the data currently being sent by the data communicating unit.

16. The communication system according to claim 10, wherein
the communication apparatus and said another communication apparatus are mounted on a vehicle.

17. A communication method for sending and receiving data with utilizing communication apparatuses connected with each other through an electric power line, comprising steps of:
- obtaining an electric power through the electric power line;
- controlling the communication apparatuses with utilizing the obtained electric power;
- sending and receiving a data through the electric power line between the connected communication apparatuses;
- acquiring a dip frequency expected in accordance with a circuit structure of the electric power line; and
- deciding a sending frequency utilized for sending a data between the connected communication apparatuses, which is a frequency lower than the acquired dip frequency.

18. The communication method according to claim 17, further comprising steps of:
- generating an attribute data for a data to be sent between the connected communication apparatuses;
- sending the generated attribute data through the electric power line; and
- deciding a sending frequency utilized for sending the attribute data to be different from a sending frequency utilized for sending the data to be sent.

19. The communication method according to claim 17, further comprising a step of:
- preparing the electric power line to have a branch point leading toward a terminal which configures a quarter wave open stub, and to have a length not more than 4 meters from the branch point to the terminal.

* * * * *